US011419133B2

(12) United States Patent
Khoshnevisan et al.

(10) Patent No.: US 11,419,133 B2
(45) Date of Patent: Aug. 16, 2022

(54) FLEXIBLE CONTROL INFORMATION FOR WIRELESS COMMUNICATIONS

(71) Applicant: QUALCOMM Incorporated, San Diego, CA (US)

(72) Inventors: Mostafa Khoshnevisan, San Diego, CA (US); Xiaoxia Zhang, San Diego, CA (US); Juan Montojo, San Diego, CA (US); Jing Sun, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 121 days.

(21) Appl. No.: 16/675,114

(22) Filed: Nov. 5, 2019

(65) Prior Publication Data

US 2020/0178272 A1 Jun. 4, 2020

Related U.S. Application Data

(60) Provisional application No. 62/773,920, filed on Nov. 30, 2018.

(51) Int. Cl.
*H04W 72/12* (2009.01)
(52) U.S. Cl.
CPC ... *H04W 72/1263* (2013.01); *H04W 72/1289* (2013.01)
(58) Field of Classification Search
None
See application file for complete search history.

(56) References Cited

U.S. PATENT DOCUMENTS

2019/0379506 A1* 12/2019 Cheng .................. H04W 4/02
2020/0015200 A1* 1/2020 Vilaipornsawai ... H04W 72/042
(Continued)

OTHER PUBLICATIONS

Ericsson: "On Beam Indication, Measurement and Reporting", 3GPP Draft, 3GPP TSG-RAN WG1 #90bis, R1-1718433, On Beam Indication, Measurement and Reporting, 3rd Generation Partnership Project (3GPP), Mobile Competence Centre, 650, Route Des Lucioles, F-06921 Sophia-Antipolis Cedex, France, vol. RAN WG1, No. Prague, Czech Republic, Oct. 9, 2017-Oct. 13, 2017, Oct. 8, 2017 (Oct. 8, 2017), XP051341615, 9 Pages, Retrieved from the Internet: URL: http://www.3gpp.org/ftp/Meetings_3GPP_SYNC/RAN1/Docs/ [retrieved on Oct. 8, 2017], Section 2, Sections 2.4-2.7, figure 1, paragraph [02.1], paragraph [02.5].
(Continued)

*Primary Examiner* — Saad Khawar
(74) *Attorney, Agent, or Firm* — Danai Nelisile Mhembere; Holland & Hart LLP

(57) ABSTRACT

Methods, systems, and devices for wireless communications are described. A user equipment (UE) may receive a downlink control message (e.g., via a physical downlink control channel (PDCCH)) from a first transmission reception point (TRP) including a transmission configuration indicator (TCI) state identifying multiple quasi co-location (QCL) relationships for the UE. The UE may determine a first set of control parameters for communication with the first TRP and a second set of control parameters for communication with a second TRP based on the downlink control message. In some cases, the second set of control parameters may be different than first set of control parameters. The UE may communicate with the first TRP and the second TRP (e.g., the UE may receive a physical downlink shared channel (PDSCH) from each TRP) based on the first set of control parameters and the second set of parameters.

48 Claims, 22 Drawing Sheets

(56) References Cited

U.S. PATENT DOCUMENTS

| | | | |
|---|---|---|---|
| 2020/0169376 A1* | 5/2020 | Gao | H04W 24/08 |
| 2020/0235759 A1* | 7/2020 | Ye | H03M 13/116 |
| 2021/0112586 A1* | 4/2021 | Bhamri | H04W 76/27 |

OTHER PUBLICATIONS

Ericsson: "On Beam Indication, Measurement, and Reporting", 3GPP Draft, 3GPP TSG-RAN WG1 NR Ad Hoc #3, R1-1716350 On Beam Indication, Measurement, and Reporting, 3rd Generation Partnership Project (3GPP), Mobile Competence Centre, 650, Route Des Lucioles, F-06921 Sophia-Antipolis Cedex, France, vol. RAN WG1, No. Nagoya, Japan, Sep. 18, 2017-Sep. 21, 2017, Sep. 17, 2017, XP051339805, 13 Pages, Retrieved from the Internet: URL:http://www.3gpp.org/ftp/Meetings_3GPP_SYNC/RAN1/Docs/ [retrieved on Sep. 17, 2017], section 3.

Huawei, et al., "Enhancements on Multi-TRP/Panel Transmission in NR", R1-1809117, 3GPP TSG RAN WG1 Meeting#94, Aug. 24, 2018 (Aug. 24, 2018), 10 Pages, see p. 7, section 2.3.3, URL: http://www.3gpp.org/ftp/tsg%5Fran/WG1%5FRL1/TSGR1%5F94/Docs/R1%201809117%2Ezip.

International Search Report and Written Opinion—PCT/US2019/060965—ISA/EPO—dated Mar. 18, 2020 (190462WO).

Qualcomm Incorporated: "Multi-TRP Enhancements", 3GPP Draft, 3GPP TSG-RAN WG1 Meeting#95, R1-1813442 Multi-TRP Enhancements, 3rd Generation Partnership Project (3GPP), Mobile Competence Centre, 650, Route Des Lucioles, F-06921, Sophia-Antipolis Cedex, France, vol. RAN WG1, No. Spokane, WA, USA, Nov. 12, 2018-Nov. 16, 2018, Nov. 11, 2018 (Nov. 11, 2018), XP051555481, 20 pages, Retrieved from the Internet: URL:http://www.3gpp.org/ftp/Meetings%5F3GPP%5FSYNC/RAN1/Docs/R1%2D1813442%2Ezip. [retrieved on Nov. 11, 2018] Sect.s 3. 4.

ZTE: "Enhancements on Multi-TRP/Panel Transmission", 3GPP Draft, 3GPP TSG RAN WG1 Meeting #95, R1-1812256 Enhancements on Multi-TRP/Panel Transmission, 3rd Generation Partnership Project (3GPP) Mobile Competence Centre, 650, Route Des Lucioles, F-06921 Sophia-Antipolis, vol. RAN WG1, No. Spokane, USA, Nov. 12, 2018-Nov. 16, 2018, Nov. 3, 2018 (Nov. 3, 2018), XP051478423, pp. 1-14, Retrieved from the Internet: URL: http://www.3gpp.org/ftp/tsg%5Fran/WG1%5FRL1/TSGR1%5F95/Docs/R1%2D1812256%2Ezip, [retrieved on Nov. 3, 2018], Paragraphs [02.1], [2.1.1], [02.3].

* cited by examiner

FLEXIBLE CONTROL INFORMATION FOR WIRELESS COMMUNICATIONS

CROSS REFERENCE

The present Application for Patent claims the benefit of U.S. Provisional Patent Application No. 62/773,920 by KHOSHNEVISAN et al., entitled "FLEXIBLE CONTROL INFORMATION FOR WIRELESS COMMUNICATIONS," filed Nov. 30, 2018, assigned to the assignee hereof, and expressly incorporated herein.

INTRODUCTION

The following relates generally to wireless communications, and more specifically to control information for wireless communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some systems, a UE may communicate with multiple network devices (e.g., transmission reception points (TRPs)). To transmit downlink information, a first network device may transmit a physical downlink control channel (PDCCH) to the UE to schedule downlink communications. The multiple network devices (e.g., the first TRP and a second TRP) may transmit corresponding physical downlink shared channels (PDSCHs) to the UE. In some cases, network devices may suffer from an under-utilization of resources and a lack of scheduling flexibility.

SUMMARY

A method of wireless communications at a UE is described. The method may include receiving, from a first network device, a downlink control message that indicates multiple transmission configuration indicator (TCI) states, determining a first set of one or more control parameters for communication with the first network device based on the downlink control message, determining a second set of one or more control parameters for communication with a second network device based on the downlink control message, and communicating with the first network device and the second network device based on the respective first set of one or more control parameters and the second set of one or more control parameters.

An apparatus for wireless communications at a UE is described. The apparatus may include a processor, memory in electronic communication with the processor, and instructions stored in the memory. The instructions may be executable by the processor to cause the apparatus to receive, from a first network device, a downlink control message that indicates multiple TCI states, determine a first set of one or more control parameters for communication with the first network device based on the downlink control message, determine a second set of one or more control parameters for communication with a second network device based on the downlink control message, and communicate with the first network device and the second network device based on the respective first set of one or more control parameters and the second set of one or more control parameters.

Another apparatus for wireless communications at a UE is described. The apparatus may include means for receiving, from a first network device, a downlink control message that indicates multiple TCI states, determining a first set of one or more control parameters for communication with the first network device based on the downlink control message, determining a second set of one or more control parameters for communication with a second network device based on the downlink control message, and communicating with the first network device and the second network device based on the respective first set of one or more control parameters and the second set of one or more control parameters.

A non-transitory computer-readable medium storing code for wireless communications at a UE is described. The code may include instructions executable by a processor to receive, from a first network device, a downlink control message that indicates multiple TCI states, determine a first set of one or more control parameters for communication with the first network device based on the downlink control message, determine a second set of one or more control parameters for communication with a second network device based on the downlink control message, and communicate with the first network device and the second network device based on the respective first set of one or more control parameters and the second set of one or more control parameters.

Some examples of the method, apparatuses, and non-transitory computer-readable medium described herein may further include operations, features, means, or instructions for determining the first set of one or more control parameters and the second set of one or more control parameters based on a same set of bits of the downlink control message.

Some examples of the method, apparatuses, and non-transitory computer-readable medium described herein may further include operations, features, means, or instructions for determining the first set of one or more control parameters and the second set of one or more control parameters based on a set of bits of a same field of the downlink control message.

In some examples of the method, apparatuses, and non-transitory computer-readable medium described herein, the first set of one or more control parameters may be determined based on a first subset of the set of bits of the same field, and the second set of one or more control parameters may be determined based on a second subset of the set of bits of the same field.

Some examples of the method, apparatuses, and non-transitory computer-readable medium described herein may further include operations, features, means, or instructions for determining the first set of one or more control parameters and the second set of one or more control parameters based on a same table of control parameters for the first network device and the second network device.

Some examples of the method, apparatuses, and non-transitory computer-readable medium described herein may further include operations, features, means, or instructions for determining the first set of one or more control parameters based on a first table of control parameters associated with the first network device, and determining the second set of one or more control parameters based on a second table of control parameters associated with the second network device.

Some examples of the method, apparatuses, and non-transitory computer-readable medium described herein may further include operations, features, means, or instructions for determining the first set of one or more control parameters based on a first set of bits of the downlink control message, and determining the second set of one or more control parameters based on a second set of bits of the downlink control message non-overlapping with the first set of bits.

In some examples of the method, apparatuses, and non-transitory computer-readable medium described herein, the first and second sets of bits may be associated with different fields of the downlink control message.

In some examples of the method, apparatuses, and non-transitory computer-readable medium described herein, determining the second set of one or more control parameters may include operations, features, means, or instructions for determining at least one control parameter of the second set of one or more control parameters based on a delta with respect to a control parameter of the first set of one or more control parameters.

Some examples of the method, apparatuses, and non-transitory computer-readable medium described herein may further include operations, features, means, or instructions for determining the delta based on a row-index of a table of control parameters for the first and second network devices.

Some examples of the method, apparatuses, and non-transitory computer-readable medium described herein may further include operations, features, means, or instructions for determining the delta based on a field of the downlink control message separate from one or more fields associated with the first set of one or more control parameters.

Some examples of the method, apparatuses, and non-transitory computer-readable medium described herein may further include operations, features, means, or instructions for identifying a first resource assignment of the first set of one or more control parameters for communication with the first network device based on at least one resource assignment field of the downlink control message, and identifying a second resource assignment of the second set of one or more control parameters for communication with the second network device, where the first and second resource assignments include different start symbol and length indicators (SLIVs), different mapping types, or both.

Some examples of the method, apparatuses, and non-transitory computer-readable medium described herein may further include operations, features, means, or instructions for determining the first resource assignment based on a first set of bits of the at least one resource assignment field, and determining the second resource assignment based on a second set of bits of the at least one resource assignment field.

In some examples of the method, apparatuses, and non-transitory computer-readable medium described herein, the first set of bits points to a row of parameters within a first resource assignment table, and the first resource assignment may be determined based on the row of parameters within the first resource assignment table.

In some examples of the method, apparatuses, and non-transitory computer-readable medium described herein, the second set of bits points to a row of parameters within a second resource assignment table, and the second resource assignment may be determined based on the row of parameters within the second resource assignment table.

In some examples of the method, apparatuses, and non-transitory computer-readable medium described herein, the first and second resource assignment tables may be the same.

In some examples of the method, apparatuses, and non-transitory computer-readable medium described herein, the second resource assignment may be identified based on a first set of bits of the at least one resource assignment field or a second set of bits non-overlapping with the first set of bits.

In some examples of the method, apparatuses, and non-transitory computer-readable medium described herein, the second resource assignment may be identified based on a resource assignment field of the downlink control message that may be different from the at least one resource assignment field.

Some examples of the method, apparatuses, and non-transitory computer-readable medium described herein may further include operations, features, means, or instructions for identifying a first rate matching parameter of the first set of one or more control parameters for communication with the first network device based on at least one rate matching field of the downlink control message, and identifying a second rate matching parameter of the second set of one or more control parameters for communication with the second network device, where the first and second rate matching parameters include different resource block (RB) and symbol level rate matching patterns, different resource element level rate matching patterns, different zero-power channel state information reference signal (ZP CSI-RS) resource sets, or any combination thereof.

In some examples of the method, apparatuses, and non-transitory computer-readable medium described herein, the second rate matching parameter may be identified based on a first set of bits of the at least one rate matching field or a second set of bits non-overlapping with the first set of bits.

In some examples of the method, apparatuses, and non-transitory computer-readable medium described herein, the first set of bits or the second set of bits correspond to a rate matching pattern of a set of rate matching patterns configured for the UE.

In some examples of the method, apparatuses, and non-transitory computer-readable medium described herein, the second rate matching parameter may be identified based on a rate matching field of the downlink control message that may be different from the at least one rate matching field.

Some examples of the method, apparatuses, and non-transitory computer-readable medium described herein may further include operations, features, means, or instructions for identifying a first transmission parameter of the first set of one or more control parameters for communication with the first network device based on at least one transmission field of the downlink control message, and identifying a second transmission parameter of the second set of one or more control parameters for communication with the second network device, where the first and second transmission parameters include different hybrid automatic repeat request (HARQ) process identifiers (IDs), different code block group transmission information (CBGTI) for retransmission associated with multiple codewords (CWs), a redundancy version (RV), or any combination thereof.

In some examples of the method, apparatuses, and non-transitory computer-readable medium described herein, the second transmission parameter may be identified based on a first set of bits of the at least one transmission field or a second set of bits non-overlapping with the first set of bits.

In some examples of the method, apparatuses, and non-transitory computer-readable medium described herein, the second transmission parameter may be identified based on a transmission field of the downlink control message that may be different from the at least one transmission field.

In some examples of the method, apparatuses, and non-transitory computer-readable medium described herein, a number of code block groups for a first CW retransmission may be different from a number of code block groups for a second CW retransmission.

A method of wireless communications at a first network device is described. The method may include identifying a first set of one or more control parameters for communication between the first network device and a UE, identifying a second set of one or more control parameters for communication between a second network device and the UE, and transmitting a downlink control message to the UE, the downlink control message indicating multiple TCI states and an indication of the first set of one or more control parameters and the second sets of control parameters.

An apparatus for wireless communications at a first network device is described. The apparatus may include a processor, memory in electronic communication with the processor, and instructions stored in the memory. The instructions may be executable by the processor to cause the apparatus to identify a first set of one or more control parameters for communication between the first network device and a UE, identify a second set of one or more control parameters for communication between a second network device and the UE, and transmit a downlink control message to the UE, the downlink control message indicating multiple TCI states and an indication of the first set of one or more control parameters and the second sets of control parameters.

Another apparatus for wireless communications at a first network device is described. The apparatus may include means for identifying a first set of one or more control parameters for communication between the first network device and a UE, identifying a second set of one or more control parameters for communication between a second network device and the UE, and transmitting a downlink control message to the UE, the downlink control message indicating multiple TCI states and an indication of the first set of one or more control parameters and the second sets of control parameters.

A non-transitory computer-readable medium storing code for wireless communications at a first network device is described. The code may include instructions executable by a processor to identify a first set of one or more control parameters for communication between the first network device and a UE, identify a second set of one or more control parameters for communication between a second network device and the UE, and transmit a downlink control message to the UE, the downlink control message indicating multiple TCI states an indication of the first set of one or more control parameters and the second sets of control parameters.

Some examples of the method, apparatuses, and non-transitory computer-readable medium described herein may further include operations, features, means, or instructions for transmitting the indication of the first set of one or more control parameters and the second set of one or more control parameters via a same set of bits of the downlink control message.

Some examples of the method, apparatuses, and non-transitory computer-readable medium described herein may further include operations, features, means, or instructions for transmitting the indication of the first set of one or more control parameters and the second set of one or more control parameters via different sets of bits of the downlink control message.

Some examples of the method, apparatuses, and non-transitory computer-readable medium described herein may further include operations, features, means, or instructions for transmitting the indication of the first set of one or more control parameters and the second set of one or more control parameters via a set of bits of a same field of the downlink control message.

In some examples of the method, apparatuses, and non-transitory computer-readable medium described herein, the first set of one or more control parameters may be indicated via a first subset of the set of bits of the same field, and the second set of one or more control parameters may be indicated via a second subset of the set of bits of the same field.

Some examples of the method, apparatuses, and non-transitory computer-readable medium described herein may further include operations, features, means, or instructions for transmitting the indication of the first set of one or more control parameters and the second set of one or more control parameters via different fields of the downlink control message.

Some examples of the method, apparatuses, and non-transitory computer-readable medium described herein may further include operations, features, means, or instructions for transmitting the indication of the first set of one or more control parameters and the second set of one or more control parameters based on a delta between a control parameter of the first set of one or more control parameters and a control parameter of the second set of one or more control parameters.

Some examples of the method, apparatuses, and non-transitory computer-readable medium described herein may further include operations, features, means, or instructions for transmitting a first resource assignment of the first set of one or more control parameters for communication with the first network device via at least one resource assignment field of the downlink control message, and transmitting a second resource assignment of the second set of one or more control parameters for communication with the second network device, where the first and second resource assignments include different SLIVs, different mapping types, or both.

Some examples of the method, apparatuses, and non-transitory computer-readable medium described herein may further include operations, features, means, or instructions for transmitting the second resource assignment via a first set of bits of the at least one resource assignment field or a second set of bits non-overlapping with the first set of bits.

Some examples of the method, apparatuses, and non-transitory computer-readable medium described herein may further include operations, features, means, or instructions for transmitting the second resource assignment via a resource assignment field of the downlink control message that may be different from the at least one resource assignment field.

Some examples of the method, apparatuses, and non-transitory computer-readable medium described herein may further include operations, features, means, or instructions for transmitting a first rate matching parameter of the first set of one or more control parameters for communication with the first network device via at least one rate matching field of the downlink control message, and transmitting a second rate matching parameter of the second set of one or more control parameters for communication with the second network device, where the first and second rate matching parameters include different RB and symbol level rate matching patterns, different resource element level rate matching patterns, different ZP CSI-RS resource sets, or any combination thereof.

Some examples of the method, apparatuses, and non-transitory computer-readable medium described herein may further include operations, features, means, or instructions for transmitting the second rate matching parameter via a first set of bits of the at least one rate matching field or a second set of bits non-overlapping with the first set of bits.

Some examples of the method, apparatuses, and non-transitory computer-readable medium described herein may further include operations, features, means, or instructions for transmitting the second rate matching parameter via a rate matching field of the downlink control message that may be different from the at least one rate matching field.

Some examples of the method, apparatuses, and non-transitory computer-readable medium described herein may further include operations, features, means, or instructions for transmitting a first transmission parameter of the first set of one or more control parameters for communication with the first network device via at least one transmission field of the downlink control message, and transmitting a second transmission parameter of the second set of one or more control parameters for communication with the second network device, where the first and second transmission parameters include different HARQ process IDs, different CBGTI for retransmission associated with multiple CWs, an RV, or any combination thereof.

Some examples of the method, apparatuses, and non-transitory computer-readable medium described herein may further include operations, features, means, or instructions for transmitting the second transmission parameter via a first set of bits of the at least one transmission field or a second set of bits non-overlapping with the first set of bits.

Some examples of the method, apparatuses, and non-transitory computer-readable medium described herein may further include operations, features, means, or instructions for transmitting the second transmission parameter via a transmission field of the downlink control message that may be different from the at least one transmission field.

In some examples of the method, apparatuses, and non-transitory computer-readable medium described herein, a number of code block groups for a first CW retransmission may be different from a number of code block groups for a second CW retransmission.

DETAILED DESCRIPTION

Figure 1:
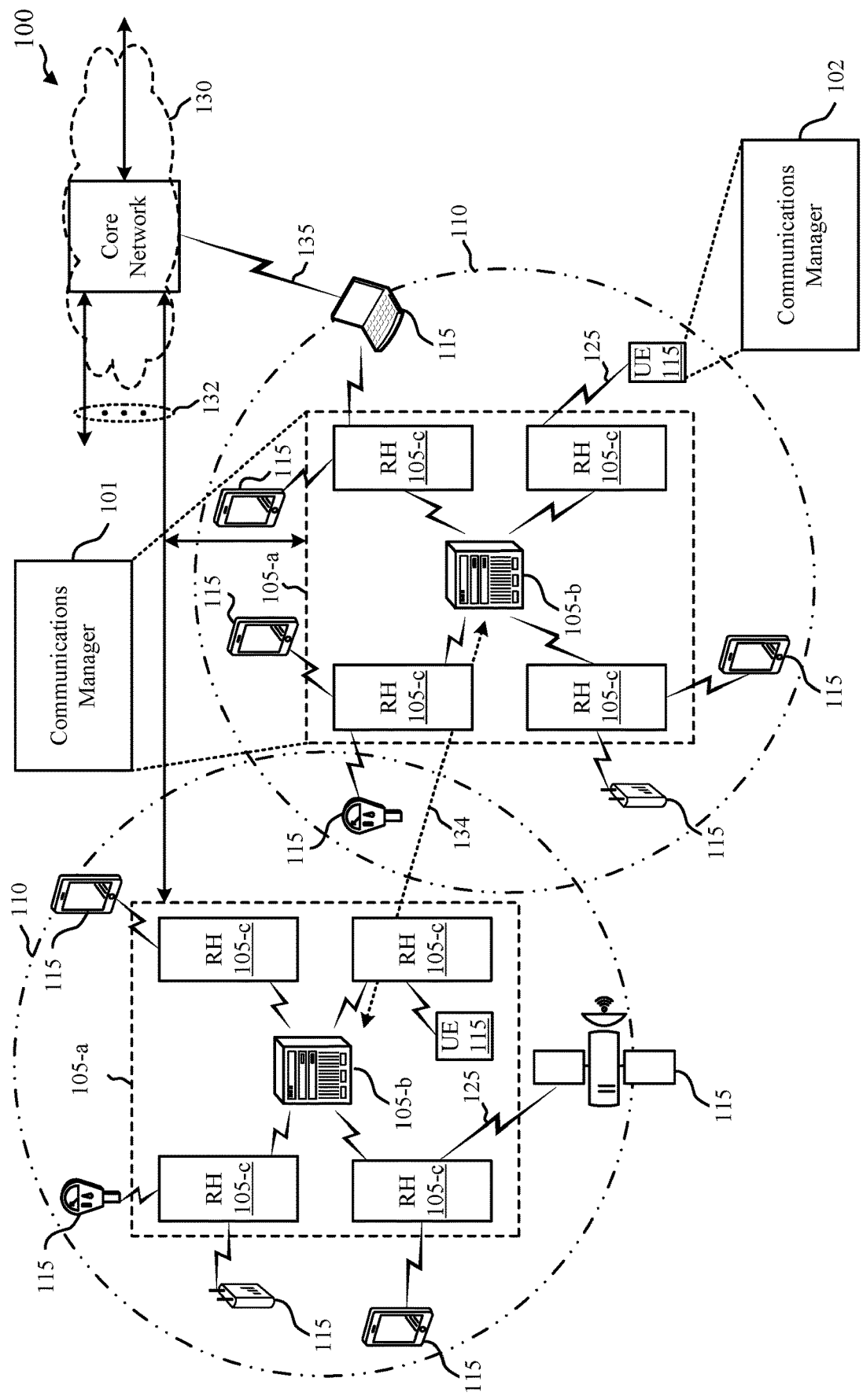
FIGS. 1 and 2 illustrate examples of wireless communications systems that support flexible control information for wireless communications in accordance with one or more aspects of the present disclosure.

In some systems, a UE may communicate with multiple network devices (e.g., TRPs) such that a UE may receive messages from each of the multiple network devices. In such cases, a TRP may indicate, to a UE, scheduling information for one or more downlink messages to be transmitted to the UE from a set of TRPs, which may include the TRP itself. The indication may be transmitted by the TRP via a single control channel (e.g., a PDCCH) and may indicate scheduling information (e.g., time resources, frequency resources) for multiple downlink transmissions (e.g., multiple PDSCHs) from the set of TRPs. The set of TRPs (e.g., a first TRP and a second TRP) may transmit corresponding PDSCHs to the UE based on the scheduling information.

The PDCCH transmitted by the TRP for scheduling downlink messages may contain downlink control information (DCI) for the UE. The DCI may contain one or more fields indicating one or more TCI states, where a TCI state may indicate one or more quasi co-location (QCL) relationships. In some cases, a QCL relationship may indicate the relationship between multiple antenna ports at a UE or TRP. For example, multiple antenna ports are considered to have a QCL relationship if, for a given symbol, one or more channel properties (Doppler shift, delay spread, average spread, Doppler spread, etc.) are similar or can be inferred from each other for signals transmitted via the multiple antenna ports. The DCI may also contain additional fields which may be used by the UE to identify information relating to time domain resource assignment, rate-matching behavior (e.g., rate-matching indicator, ZP CSI-RS triggering), HARQ processes (e.g., HARQ feedback number, CBGTI), among others. In some examples, the TCI state may indicate whether a subsequent transmission is a single TRP transmission or a multi-TRP transmission.

To improve scheduling flexibility and resource utilization, a UE may receive a PDCCH and may interpret DCI of the PDCCH differently based on whether a TCI state indicated by the DCI refers to multiple QCL relationships. For example, a UE may receive a PDCCH whose DCI indicates a TCI field that may indicate one or more TCI states referring to multiple QCL relationships and may identify that some DCI fields (e.g., DCI fields related to time domain resource assignments, rate-matching, ZP CSI-RS triggering, HARQ processes, and CBGTI) contain information that may refer to some or each of the TRPs associated with the TCI state. Additionally or alternatively, the UE may use one or more DCI fields to identify information related to downlink transmissions (or other transmission or retransmission information) for the UE. For instance, bits within a DCI field may point to preconfigured tables or sets containing such information. The preconfigured tables or sets may include configurations (e.g., in a list) for each TRP or may include a baseline configuration for one TRP and corresponding delta configurations (e.g., a configuration defined by an offset from the baseline configuration) for an additional TRP. In some cases, a UE may determine the size of the fields to be different or that additional fields exist within the DCI when compared to DCI whose TCI field may indicate one or more TCI states referring to a single QCL relationship. The UE may use the fields to determine information for communications between the UE (e.g., resource allocation, rate matching) and the TRPs.

Particular aspects of the subject matter described herein may be implemented to realize one or more advantages. The described techniques may support improvements in multi-TRP transmission scheduling, increase control signaling flexibility, and increase resource utilization, among other advantages. As such, supported techniques may include improved network operations and, in some examples, may promote network efficiencies, among other benefits.

Aspects of the disclosure are initially described in the context of wireless communications systems. Aspects of the disclosure are further illustrated by and described with reference to TRP scheduling, TCI identification processes, and a process flow. Aspects of the disclosure are further illustrated by and described with reference to apparatus diagrams, system diagrams, and flowcharts that relate to flexible control information for wireless communications.

FIG. 1 illustrates an example of a wireless communications system 100 that supports flexible control information for wireless communications in accordance with one or more aspects of the present disclosure. The wireless communications system 100 includes network devices 105, UEs 115, and a core network 130. In some examples, the wireless communications system 100 may be an LTE network, an LTE-Advanced (LTE-A) network, an LTE-A Pro network, or an NR network. In some cases, wireless communications system 100 may support enhanced broadband communications, ultra-reliable (e.g., mission critical) communications, low latency communications, or communications with low-cost and low-complexity devices.

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by network devices 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices 105 (e.g., network device 105-*a*), which may be an example of a base station (e.g., eNB, network access devices, gNB), or network device 105-*b*, which may be an example of an access node controller (ANC)), may interface with the core network 130 through backhaul links 132 (e.g., S1, S2) and may perform radio configuration and scheduling for communication with the UEs 115. In various examples, the network devices 105-*b* may communicate, either directly or indirectly (e.g., through core network 130), with each other over backhaul links 134 (e.g., X1, X2), which may be wired or wireless communication links.

Each network device 105-*b* may also additionally or alternatively communicate with a number of UEs 115 through a number of other network devices 105-*c*, where network device 105-*c* may be an example of a smart radio head (or through a number of smart radio heads) or a TRP. In alternative configurations, various functions of each network device 105 may be distributed across various network devices 105 (e.g., radio heads and access network controllers) or consolidated into a single network device 105 (e.g., a base station), each of which may be referred to as a TRP 105.

Network device 105 may wirelessly communicate with UEs 115 via one or more base station antennas. Network device 105 described herein may include or may be referred to by those skilled in the art as a base transceiver station, a radio base station, an access point, a radio transceiver, a NodeB, an eNodeB (eNB), a next-generation Node B or giga-NodeB (either of which may be referred to as a gNB), a Home NodeB, a Home eNodeB, or some other suitable terminology. Wireless communications system 100 may include network devices 105 of different types (e.g., macro or small cell base stations). The UEs 115 described herein may be able to communicate with various types of network devices 105 and network equipment including macro eNBs, small cell eNBs, gNBs, relay base stations, and the like.

Each network device 105 may be associated with a particular geographic coverage area 110 in which communications with various UEs 115 is supported. Each network device 105 may provide communication coverage for a respective geographic coverage area 110 via communication links 125, and communication links 125 between a network device 105 and a UE 115 may utilize one or more carriers. Communication links 125 shown in wireless communications system 100 may include uplink transmissions from a UE 115 to a network device 105, or downlink transmissions from a network device 105 to a UE 115. Downlink transmissions may also be called forward link transmissions while uplink transmissions may also be called reverse link transmissions.

The geographic coverage area 110 for a network device 105 may be divided into sectors making up only a portion of the geographic coverage area 110, and each sector may be associated with a cell. For example, each network device 105 may provide communication coverage for a macro cell, a small cell, a hot spot, or other types of cells, or various combinations thereof. In some examples, a network device 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same network device 105 or by different network devices 105. The wireless communications system 100 may include, for example, a heterogeneous LTE/LTE-A/LTE-A Pro or NR network in which different types of network devices 105 provide coverage for various geographic coverage areas 110.

The term "cell" refers to a logical communication entity used for communication with a network device 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like. A UE 115 may communicate with the core network 130 through communication link 135.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a network device 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a network device 105. Other UEs 115 in such a group may be outside the geographic coverage area 110 of a network device 105, or be otherwise unable to receive transmissions from a network device 105. In some cases, groups of UEs 115 communicating via D2D communications may utilize a one-to-many (1:M) system in which each UE 115 transmits to every other UE 115 in the group. In some cases, a network device 105 facilitates the scheduling of resources for D2D communications. In other cases, D2D communications are carried out between UEs 115 without the involvement of a network device 105.

Network devices 105 may communicate with the core network 130 and with one another. For example, network devices 105 may interface with the core network 130 through backhaul links 132 (e.g., via an S1, N2, N3, or other interface). Network devices 105 may communicate with one another over backhaul links 134 (e.g., via an X2, Xn, or other interface) either directly (e.g., directly between network devices 105) or indirectly (e.g., via core network 130).

At least some of the network devices, such as a network device 105, may include subcomponents such as an access network entity, which may be an example of an ANC. Each access network entity may communicate with UEs 115 through a number of other access network transmission entities, which may be referred to as a radio head, a smart radio head, or a TRP. In some configurations, various functions of each access network entity or network device 105 may be distributed across various network devices (e.g., radio heads and access network controllers) or consolidated into a single network device (e.g., a network device 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and network devices 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as network devices 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, network device 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a network device 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same CW) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a network device 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a network device 105 may use multiple antennas or antenna arrays to conduct beamforming operations for directional communications with a UE 115. For instance, some signals (e.g., synchronization signals, reference signal (RSs), beam selection signals, or other control signals) may be transmitted by a network device 105 multiple times in different directions, which may include a signal being transmitted according to different beamforming weight sets associated with different directions of transmission. Transmissions in different beam directions may be used to identify (e.g., by the network device 105 or a receiving device, such as a UE 115) a beam direction for subsequent transmission, reception, or a combination thereof by the network device 105. Some signals, such as data signals associated with a particular receiving device, may be transmitted by a network device 105 in a single beam direction (e.g., a direction associated with the receiving device, such as a UE 115). In some examples, the beam direction associated with transmissions along a single beam direction may be determined based on a signal that was transmitted in different beam directions. For example, a UE 115 may receive one or more of the signals transmitted by the network device 105 in different directions, and the UE 115 may report to the network device 105 an indication of the signal the UE 115 received with a highest signal quality, or an otherwise acceptable signal quality. Although these techniques are described with reference to signals transmitted in one or more directions by a network device 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the network device 105, such as synchronization signals, RSs, beam selection signals, or other control signals. For example, a receiving device may try multiple receive directions by receiving via different antenna subarrays, by processing received signals according to different antenna subarrays, by receiving according to different receive beamforming weight sets applied to signals received at a set of antenna elements of an antenna array, or by processing received signals according to different receive beamforming weight sets applied to signals received at a set of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a network device 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a network device 105 may be located in diverse geographic locations. A network device 105 may have an antenna array with a number of rows and columns of antenna ports that the network device 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A medium access control (MAC) layer may perform priority handling and multiplexing of logical channels into transport channels. The MAC layer may also use HARQ to provide retransmission at the MAC layer to improve link efficiency. In the control plane, the Radio Resource Control (RRC) protocol layer may provide establishment, configuration, and maintenance of an RRC connection between a UE 115 and a network device 105 or core network 130 supporting radio bearers for user plane data. At the Physical layer, transport channels may be mapped to physical channels.

In some cases, UEs 115 and network devices 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a network device 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an Evolved Universal Terrestrial Radio Access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or DFT-s-OFDM).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., network devices 105 or UEs 115) may have a hardware configuration that supports communications over a particular carrier bandwidth, or may be configurable to support communications over one of a set of carrier bandwidths. In some examples, the wireless communications system 100 may include network devices 105, UEs 115, or a combination thereof that may support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or network device 105, utilizing eCCs may transmit wideband signals (e.g., according to frequency channel or carrier bandwidths of 20, 40, 60, 80 MHz) at reduced symbol durations (e.g., 16.67 microseconds). A TTI in eCC may include one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some cases, a UE 115 may be configured (e.g., by RRC signaling) with up to M TCI states, which may be used for QCL indication. UE 115-$a$ may use a MAC control element (MAC-CE) to select up to $2^N$ TCI states (e.g., 8 states where N=3) out of the M configured states, which may be used for PDSCH QCL indication. For example, a MAC-CE transmitted from a base station may list $2^N$ states as activated and M-$2^N$ as deactivated. For $2^N$ TCI states, N bits in a DCI may dynamically indicate the TCI state for a corresponding PDSCH transmission. In some cases, a downlink control channel (e.g., a PDCCH) may carry the DCI.

A TCI field in a downlink control message (e.g., in DCI, an RRC message, a MAC-CE) may indicate one or more TCI states referring to one or more RSs for QCL relationship indication of DMRS ports of a PDSCH. Such a QCL relationship may, for instance, be that a port transmitting downlink RSs may have similar (e.g., approximately equivalent) channel characteristics as the DMRS ports. The channel characteristics which are similar may be listed in a QCL type. The QCL types that each downlink RS corresponds to may be one of several types: type A, which may include similar Doppler shift, Doppler spread, average delay, and delay spread; type B, including similar Doppler shift and Doppler spread; type C, including similar doppler shift and average delay; or type D, similar of equivalent spatial reception parameters.

If the TCI field indicates two TCI states, the subsequent transmission may be a single TRP transmission. Alternatively, if the TCI field indicates two TCI states (e.g., two or more), where each TCI state determines a QCL relationship by referring to an RS set for a corresponding DMRS port group, then the subsequent transmission may be a multi-TRP transmission. For instance, a TCI field may indicate two TCI states, where a DMRS port group associated with the first TCI state corresponds to a first TRP 105 and the DMRS port group associated with the second TCI state corresponds to a second TRP 105. Although the present disclosure may refer to two TCI states and two QCL relationships, it should be noted that more than two QCL relationships, more than two TCI states, and more than two TRPs 105 may be used without deviating from the scope of the present disclosure.

PDSCHs may carry one or more CWs which may be mapped to one or more layers. For instance, a single CW may be mapped to M layers (e.g., 4 layers). Each TRP 105 performing in a multi-TRP transmission may transmit one or more layers of the M layers and each layer may be transmitted by one TRP 105. In one example, if there are 2 TRPs 105 participating in multi-TRP transmission and M=4, the first TRP 105 may transmit layers 1 and 2 and the second TRP 105 may transmit layers 3 and 4. In another example, if there are 4 TRPs 105 participating in multi-TRP transmission and M=4, the first TRP 105 may transmit layer 1, the second TRP 105 may transmit layer 2, the third TRP 105 may transmit layer 3, the fourth TRP 105 may transmit layer 4. In cases where there are multiple CWs, each CW may be mapped to a distinct set of layers and each layer may be transmitted by one TRP 105 of the TRPs 105 performing multi-TRP transmission. In one example, if there are 2 TRPs 105 participating in multi-TRP transmission and M=4, a first CW may be mapped to layers 1 and 2 and a second CW may be mapped to layers 3 and 4. A combination of these layers may be transmitted by a first TRP 105 and the remaining layers may be transmitted by a second TRP 105. As such, it is possible that one TRP 105 may transmit all layers of a CW (e.g., a first TRP 105 may transmit layers 1 and 2) or that multiple TRPs 105 may transmit all layers of a CW (a first TRP 105 may transmit layer 1 and a second TRP 105 may transmit layer 2).

Wireless communications system 100 may support efficient techniques for creating flexible control information for wireless communications. For example, A UE 115 may receive a downlink control message (e.g., a PDCCH, RRC, MAC-CE) from a first TRP 105 including a TCI field indicating multiple TCI states or multiple QCL relationships for the UE 115. The UE 115 may determine a first set of one or more control parameters for communication with the first TRP 105 and a second set of one or more control parameters for communication with a second TRP 105 based on the downlink control message. In some cases, the second set of one or more control parameters may be different than first set of one or more control parameters. The UE 115 may communicate with the first TRP 105 and the second TRP 105 (e.g., the UE 115 may receive a PDSCH from each TRP 105) based on the first set of one or more control parameters and the second set of one or more control parameters.

One or more of the TRPs 105 may include a communications manager 101, which may identify a first set of one or more control parameters for communication between a first TRP 105 and a UE 115; identify a second set of one or more control parameters for communication between a second TRP 105 and the UE 115, where the second set of one or more control parameters is different from the first set of one or more control parameters; and transmit a downlink control message (e.g., a DCI) to the UE 115, where the downlink control message includes a TCI field indicating multiple TCI states or multiple QCL relationships for the UE 115 and an indication of the first set of one or more control parameters and the second set of one or more control parameters.

UEs 115 may include a communications manager 102, which may receive, from a first TRP 105, a downlink control message that includes a TCI field indicating multiple TCI states or multiple QCL relationships for the UE 115, determine a first set of one or more control parameters for communication with the first TRP 105 based on the downlink control message, determine a second set of one or more control parameters for communication with a second TRP 105 based on the downlink control message, and communicate with the first TRP 105 and second TRP 105 based on the respective first set of one or more control parameters and the second set of one or more control parameters.

Figure 2:
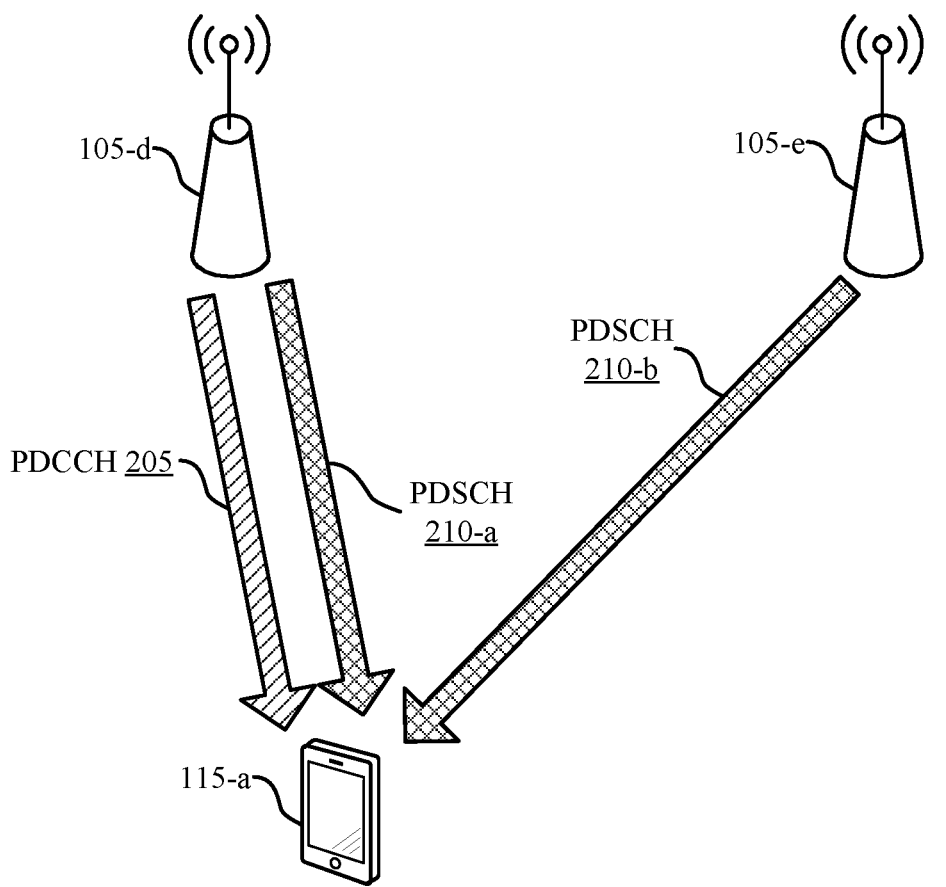

FIG. 2 illustrates an example of a wireless communications system 200 that supports flexible control information for wireless communications in accordance with one or more aspects of the present disclosure. In some examples, wireless communications system 200 may implement aspects of wireless communications system 100. For instance, wireless communications system 200 may include TRPs 105-*d* and 105-*e* and UE 115-*a*, which may be examples of TRPs 105 and UEs 115 as described with reference to wireless communications system 100. In some examples, a base station may be a TRP 105. For example, a base station may be a first TRP 105, a second TRP 105, or a network entity (e.g., network device) that may control the first and second TRPs 105.

TRP 105-*d* may transmit a PDCCH 205 to UE 115-*a*. The PDCCH 205 may contain information used by UE 115-*a* for receiving PDSCH 210 (e.g., PDSCH 210-*a* and PDSCH 210-*b*), such as DCI (e.g., DCI with DCI format 1_1) that may indicate a TCI field indicating one or more TCI states referring to one or more QCL relationships. If the TCI field refers to multiple TCI states (e.g., or the TCI states refer to one or more QCL relationships), where at least one of the multiple TCI states or QCL relationships is associated with TRP 105-*d* and another is associated with TRP 105-*e*, UE 115-*a* may determine that TRP 105-*d* and TRP 105-*e* are to perform multi-TRP transmission of PDSCH 210. In such a case, UE 115-*a* may reference preconfigured tables or sets to determine communication information (e.g., resource allocation, rate matching, transmission parameters) of each TRP 105. Additionally or alternatively, UE 115-*a* may derive aspects of the behavior for each TRP 105 from one or more fields of the DCI.

TRPs 105-*d* and 105-*e* may transmit PDSCH 210 to UE 115-*a* through a variety of layers. If the PDCCH 205 schedules one CW, the CW may be split between some or all layers. Alternatively, if the PDCCH schedules two CWs, the first CW may be mapped to a first set of layers and the second CW may be mapped to the remaining layers. In some cases (e.g., if the TCI state is associated with TRPs 105-*d* and 105-*e*), the layers may be split between TRP 105-*d* and TRP 105-*e*. For instance, TRP 105-*d* may transmit a first set of the layers (e.g., via PDSCH 210-*a*) and TRP 105-*e* may transmit the remaining layers (e.g., via PDSCH 210-*b*). If the PDCCH schedules multiple CWs, the first set of layers and the remaining layers may each include layers related to one CW or may include layers related to more than one CW of the multiple CWs. For instance, if a first CW is mapped to layers 1 and 2 and a second CW is mapped to layers 3 and 4, TRP 105-*d* may transmit layers related to the first CW (e.g., layers 1 and 2), the second CW (e.g., layers 3 and 4), or layers related to both CWs (e.g., layers 1 and 3), with TRP 105-*e* transmitting over the remaining layers.

In some cases, interpreting DCI differently based on whether the DCI indicates a TCI field indicating multiple TCI sates, or whether the multiple TCI states indicate multiple QCL relationships may enable at least partial independence of each TRP 105 when performing multi-TRP transmissions and may enable flexible communication (e.g., each TRP 105 may be able to allocate PDSCHs to different resources, rate match differently, or use different HARQ IDs, CBGTI, and RVs). Using a single field of the DCI to infer behavior of multiple TRPs 105 may enable consistency between DCIs, regardless of whether the TCI field indicates a single TCI state (e.g., a single QCL relationship) or multiple TCI states (e.g., multiple QCL relationships) (e.g., the format or size of each DCI may remain the same). Using multiple fields of the DCI may increase an amount of entries (e.g., a maximum amount of entries) in a preconfigured table or may increase a number of options a TRP 105 may choose from (e.g., may increase the maximum number of CBGTI, HARQ process IDs, or RVs).

Figure 3:
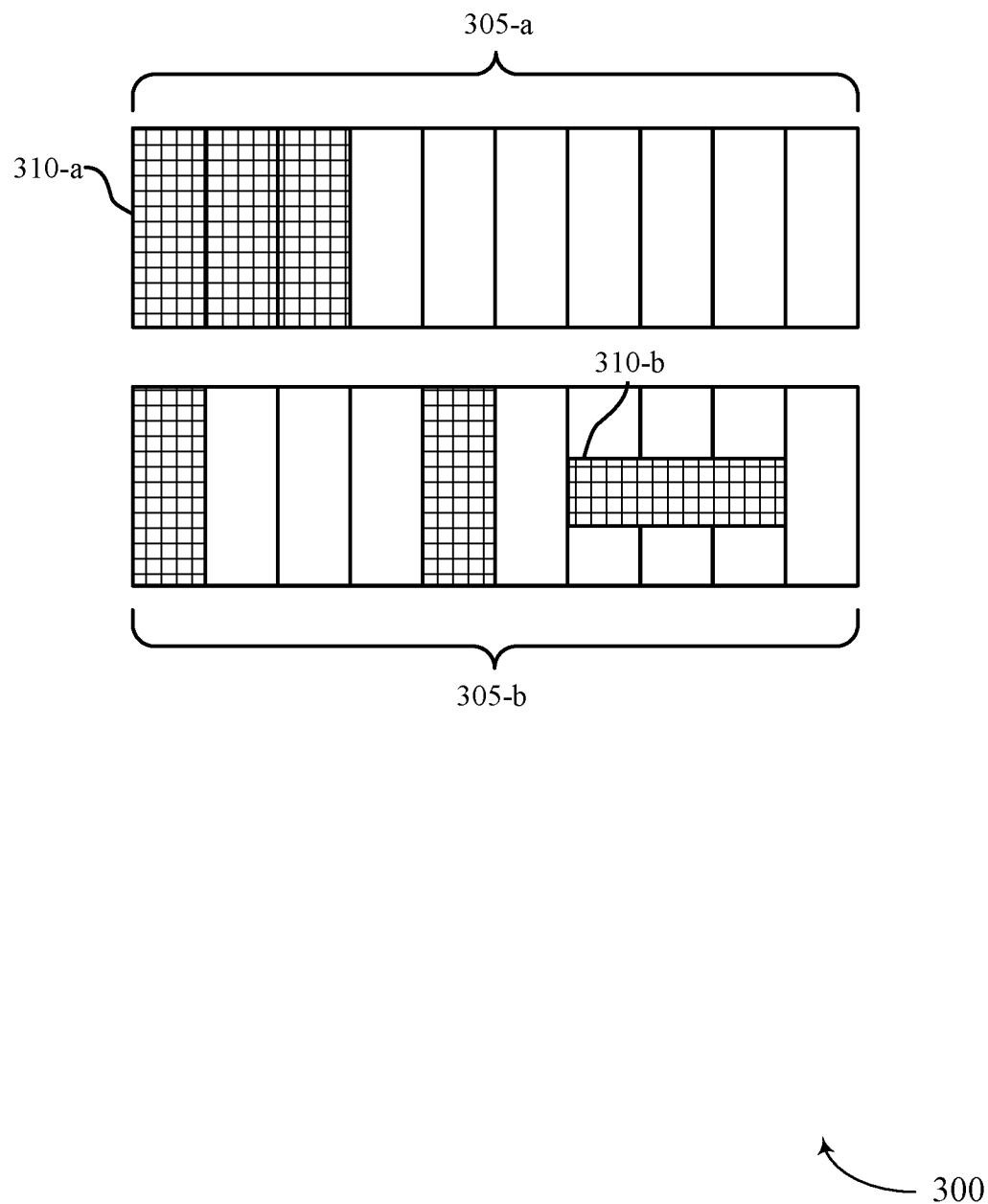
FIG. 3 illustrates an example of TRP scheduling that supports flexible control information for wireless communications in accordance with one or more aspects of the present disclosure.

FIG. 3 illustrates an example of TRP scheduling 300 that supports flexible control information for wireless communications in accordance with one or more aspects of the present disclosure. In some examples, TRP scheduling 300 may implement aspects of wireless communications systems 100 and 200. For instance, TRP scheduling 300 may be implemented by TRPs 105 and UEs 115 as described with reference to wireless communications systems 100 and 200.

Resource allocation 305-*a* may represent an allocation of resources for a first TRP 105 over a TTI (e.g., a subframe, a slot, a mini-slot, a symbol). Resource allocation 305-*b* may represent an allocation of resources for a second TRP 105 over the TTI. In general, resource allocations 305 may include occupied resources 310 and available resources 315. Occupied resources 310 may, for instance, include resources occupying all channels within a symbol (e.g., occupied resource 310-*a*) or resources occupying a subchannel of a symbol (e.g., occupied resource 310-*b*). Resource allocation 305-*a* may not be identical to resource allocation 305-*b*. As such, the first TRP 105 may schedule transmission of a CW or a portion of a CW in a first set of symbols and the second TRP 105 may schedule transmission of a CW or a portion of a CW in a second set of symbols, where the first set and second set may or may not overlap.

Figure 4:
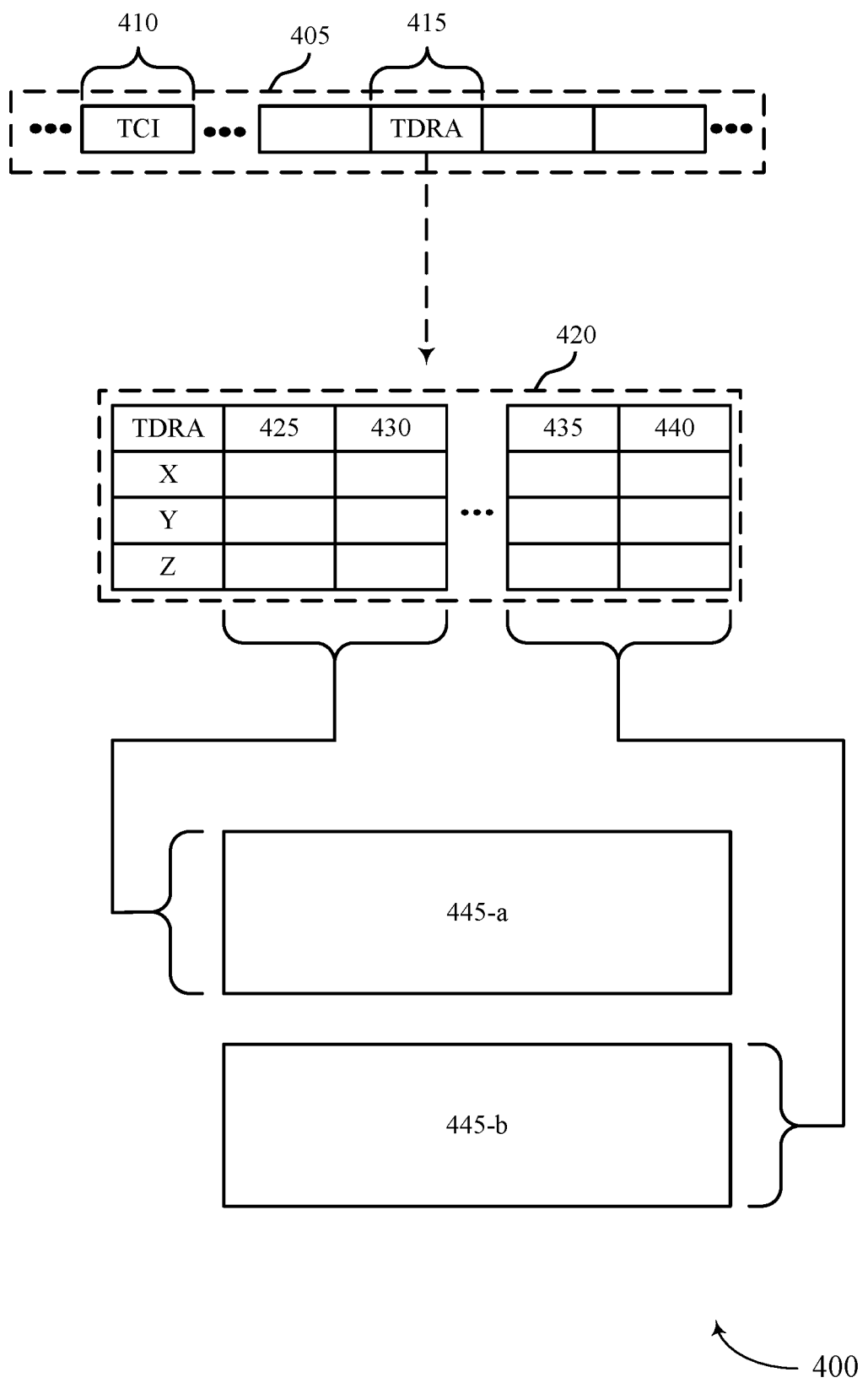
FIGS. 4 and 5 illustrate examples of TCI identification processes that support flexible control information for wireless communications in accordance with one or more aspects of the present disclosure.

FIG. 4 illustrates an example of a TCI identification process 400 that supports flexible control information for wireless communications in accordance with one or more aspects of the present disclosure. In some examples, TCI identification process 400 may implement aspects of wireless communications systems 100 and 200. For instance, TCI identification process 400 may be implemented by TRPs 105 and UEs 115 as described with reference to wireless communications systems 100 and 200. Additionally, TCI identification process 400 may include resource allocations 445, which may be examples of resource allocations 305 as described with reference to FIG. 3.

A UE 115 may receive a PDCCH containing DCI 405 from a TRP 105. The DCI 405 may contain a TCI field 410 indicating one or more TCI states. If the TCI field refers to multiple (e.g., two) TCI states or the TCI states indicate multiple QCL relationships, the UE 115 may refer to a different preconfigured table 420 (e.g., an RRC-configured table) than if the TCI field 410 refers to a single QCL TCI state, or the TCI state indicates a single QCL relationship. The preconfigured table 420 may be used to interpret a time domain resource assignment field 415 of the DCI and may enable different CWs, layers, or a combination thereof from different TRPs to have different time domain resource assignments. Information from DCI 405 may be used by UE 115 to infer behavior of TRPs 105 over resource allocations 445-*a* and 445-*b*. Resource allocation 445-*a* may correspond to an allocation of resources for a first TRP 105 and resource allocation 445-*b* may correspond to an allocation of resources for a second TRP 105. Additionally, resource allocations 445-*a* and 445-*b* may span a same subframe.

The preconfigured table 420 may include one or more columns and one or more rows. The first column may refer to a value of the time domain resource assignment field 415, which may map to a row index of preconfigured table 420. The additional columns may each refer to a TRP property (e.g., TRP properties 425, 430, 435, and 440). SLIV and mapping type (e.g., mapping type A or B) may be derived by choosing a row based on the index mapped from the time domain resource assignment field 415 (e.g., if the value of the time domain resource assignment field 415 is X, the X row may be chosen) and extracting the corresponding TRP property values (e.g., the values of TRP properties 425, 430, 435, and 440 for row X). DMRS position, mapping type, and Ko may also be listed in the table and each may be listed under one column (e.g., each TRP 105 may use the same value) or may be listed separately (e.g., each TRP 105 may use separate values). Although TRP properties 425 and 430 are depicted as next to each other and TRP properties 435 and 440 are depicted as next to each other, it should be noted that these properties may be distributed in any order or in any column of preconfigured table 420 without deviating from the scope of the present disclosure.

In some cases, half of the bits of the time domain resource assignment field 415 may represent a row index of a first table (e.g., for a first TRP 105) and the other half may represent a row index of a second table (e.g., for a second TRP 105). To account for this split, the number of bits in the time domain resource assignment field 415 may be increased compared to that of a time domain resource assignment field 415 of the DCI 405 whose TCI field refers to a single TCI state and the TCI state may refer to a single QCL relationship. Additionally or alternatively, separate time domain resource assignment fields 415 may be defined (e.g., a first time domain resource assignment field 415 may refer to a preconfigured table 420 for the first TRP 105 and a second time domain resource assignment field 415 may refer to a separate preconfigured table 420 for the second TRP 105). If two tables are being utilized as described herein, the first table may contain TRP properties 425 and 430 and the second table may contain TRP properties 435 and 440. It should be noted that although four TRP properties are listed here, more or fewer TRP properties may be used without deviating from the scope of the present disclosure.

According to some aspects, a control parameter (e.g., associated with a second TRP 105) may be determined based on a delta with respect to a second control parameter (e.g., associated with a first TRP 105). A downlink control message may be transmitted to a UE and may be used by the UE to determine the first control parameter, the second control parameter, or both. In one example, start symbol and length (e.g., a SLIV) for PDSCH transmission may be separately defined for each TRP 105. For instance, TRP properties 425 and 430 may represent start symbol and length, respectively, for PDSCH transmission within resource allocation 445-*a* and TRP properties 435 and 440 may represent start symbol and length, respectively, for PDSCH transmission within resource allocation 445-*b*. In another example, start symbol and length for PDSCH transmission by the first TRP 105 may be explicitly defined (e.g., may be defined as a baseline configuration), while start symbol and length for PDSCH transmission by the second TRP 105 may be defined by an offset from the baseline configuration (e.g., a delta configuration). For instance, TRP properties 425 and 430 may represent start symbol and length, respectively, for PDSCH transmission resource allocation 445-*a* and TRP properties 435 and 440 may represent a start symbol and length offset, respectively, which may be combined (e.g., via addition or subtraction) with the baseline start symbol and length to derive the start symbol and length for PDSCH transmission within resource allocation 445-*b*.

Figure 5:
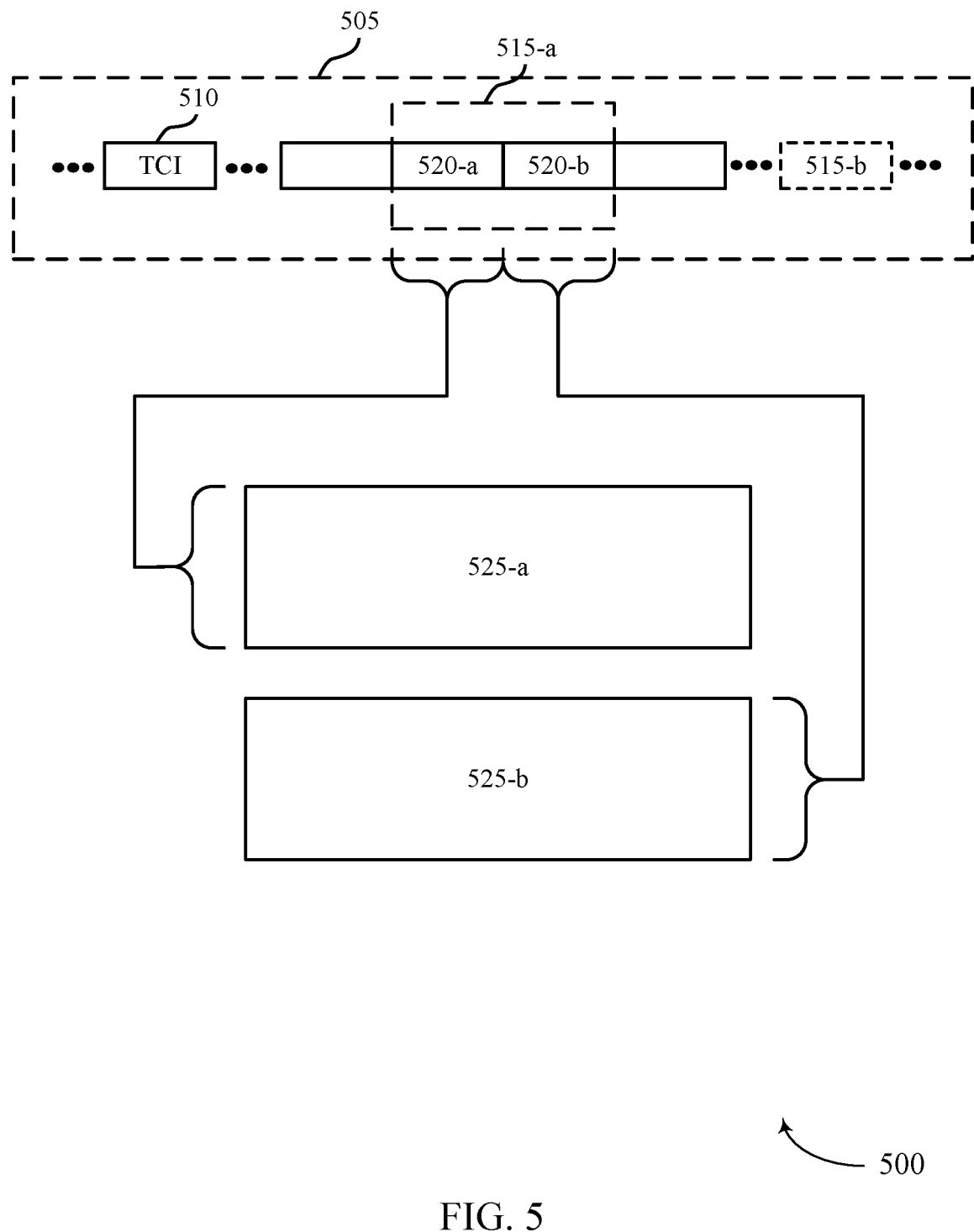

FIG. 5 illustrates an example of a TCI identification process 500 that supports flexible control information for wireless communications in accordance with one or more aspects of the present disclosure. In some examples, TCI identification process 500 may implement aspects of wireless communications systems 100 and 200. For instance, TCI identification process 500 may be implemented by TRPs 105 and UEs 115 as described with reference to wireless communications systems 100 and 200. Additionally, TCI identification process 500 may include resource allocations 525, which may be examples of resource allocations 305 as described with reference to FIG. 3.

A UE 115 may receive a PDCCH containing DCI 505 from a TRP 105. The DCI 505 may contain a TCI field 510 indicating a TCI state. If the TCI field 510 refers to multiple (e.g., two) TCI states, of the TCI states indicate multiple QCL relationships, the UE 115 may interpret one or more DCI fields 515 differently than if the TCI field 510 refers to a single TCI state, or the TCI state refers to a single QCL relationship. Information from DCI 505 may be used by UE 115 to infer behavior of TRPs over resource allocations 525-a and 525-b. Resource allocation 525-a may correspond to a first TRP 105 and resource allocation 525-b may correspond to a second TRP 105. Additionally, resource allocations 525-a and 525-b may span a same subframe.

In one example, the UE 115 may interpret one or more DCI fields 515 for rate matching behavior differently if the TCI field 510 refers to multiple TCI states, or the TCO states indicate multiple QCL relationships. For instance, DCI field 515-a may represent a rate matching indicator field or a ZP CSI-RS trigger field, which may be fields used to control rate matching behavior. The rate matching indicator field may be used, for instance, for RB level rate matching, and may point to one of a number of rate match patterns. Such rate match patterns may be configured by a field (e.g., a rateMatchPatternToAddModList) in a PDSCH-Config or a ServingCellConfigCommon message. ZP CSI-RS trigger field may be used for resource element (RE) level rate matching and may point to one of a number (e.g., 4) of previously configured ZP CSI-RS resource sets.

In one case of interpreting rate matching behavior differently, each rate match pattern (e.g., each RateMatchPattern), ZP CSI-RS sets, or a combination thereof configured at the UE 115 may each contain a number of sets (e.g., 2) corresponding to a number of TRPs 105 (e.g., 2). For instance, if there are two TRPs 105 that are to participate in multi-TRP transmission, each rate match pattern or ZP CSI-RS set may have two sets, a first set for the first TRP 105 and a second set for the second TRP 105 (e.g., for joint indication). In such a case, DCI field 515-a may point to a single rate match pattern or ZP CSI-RS set, which may define rate matching behavior for both resource allocations 525-a and 525-b.

Alternatively, rate match patterns, ZP CSI-RS sets, or a combination thereof may be separately configured for each TRP 105. For instance, if there are two TRPs 105 that are to participate in multi-TRP transmission, a first set of rate match patterns, ZP CSI-RS sets, or a combination thereof may be configured for the first TRP 105 and a second set of rate match patterns, ZP CSI-RS sets, or a combination thereof may be configured separately for the second TRP 105. In such cases, subfield 520-a of DCI field 515-a may point to a rate match pattern, ZP CSI-RS set, or a combination thereof for resource allocation 525-a and subfield 520-b of DCI field 515-a may point to a rate match pattern, ZP CSI-RS set, or a combination thereof for resource allocation 525-b. Half of the bits of DCI field 515 may be apportioned to subfield 520-a and the remaining half may be apportioned to subfield 520-b. In some cases, the number of bits in DCI field 515-a may be increased for cases where the TCI state of TCI field 510 indicates multi-QCL relationships compared to cases where single-QCL relationships are indicated. Additionally or alternatively, separate DCI fields 515 may be used for the set of rate match patterns, ZP CSI-RS sets, or a combination thereof corresponding to resource allocation 525-a (e.g., DCI field 515-a) and the set of rate match patterns, ZP CSI-RS sets, or a combination thereof corresponding to resource allocation 525-b (e.g., DCI field 515-b).

In another case of interpreting rate matching behavior differently, each rate match pattern (e.g., each RateMatch-Pattern), ZP CSI-RS sets, or a combination thereof configured at the UE 115 may contain a set for a first TRP 105 (e.g., a baseline configuration) and contain one or more delta configurations for additional TRPs 105. For instance, if there are two TRPs 105 that are to participate in multi-TRP transmission, each rate match pattern or ZP CSI-RS set may define a set for the first TRP 105 (e.g., a baseline configuration) as well as an offset which may be combined with the baseline configuration to derive a set for the second TRP 105 (i.e., a delta configuration). In such a case, DCI field 515-a may point to a single rate match pattern or ZP CSI-RS set, which may define rate matching behavior for both the first TRP 105 and the second TRP 105 (e.g., for resource allocations 525-a and 525-b). Alternatively, the baseline configuration and the delta configuration may be configured separately (e.g., by a separate field in a DCI with its own parameters). In such cases, subfield 520-a of DCI field 515-a may point to the baseline configuration and subfield 520-b of DCI field 515-a may point to the delta configuration. Half of the bits of DCI field 515-a may be apportioned to subfield 520-a and the remaining half may be apportioned to subfield 520-b. In some cases, the number of bits in DCI field 515-a may be increased for cases where the TCI state of TCI field 510 indicates multi-QCL relationships compared to cases where single-QCL relationships are indicated. Additionally or alternatively, separate DCI fields 515 may be used for the baseline configuration (e.g., DCI field 515-a) and the delta configuration (e.g., DCI field 515-b).

In another example, the UE 115 may interpret one or more HARQ process ID fields differently if TCI field 510 refers to multiple TCI states or multiple QCL relationships (e.g., two) and if multiple CWs are to be transmitted. In one example, subfield 520-a, which may contain half of the bits of DCI field 515-a, may indicate a HARQ process ID for a first CW and subfield 520-b, which may contain the remaining bits, may indicate the HARQ process ID for a second CW. The DCI field 515-a may include 4 bits. As such, each subfield 520 may have 2 bits and may refer to up to 4 HARQ processes per subfield 520 (e.g., per CW). Additionally or alternatively, the number of bits for the DCI field 515-a may be increased, which may allow for more HARQ process IDs for each CW, or separate DCI fields 515 may be configured for HARQ process numbers associated with the first CW (e.g., DCI field 515-a) and HARQ process numbers associated with the second CW (e.g., DCI field 515-b). It should be noted, as described herein, that HARQ process numbers associated with a CW may be used by the first and second TRPs 105 (e.g., if different layers of the CW are being transmitted by each TRP 105) or may be used by just one TRP 105 (e.g., if a single TRP is transmitting the CW).

In another example, the UE 115 may interpret one or more CBGTI fields differently if TCI field 510 indicates multiple TCI states or multiple QCL relationships. CBGTI may be a bitmap indicating which CBGs are present in a retransmission. A number of bits (e.g., 0, 2, 4, 6, or 8) may depend on a value of a maxCodeBlockGroupsPerTransportBlock and a number of scheduled CWs or transport blocks (TBs). In one example, DCI field 515-a may represent a maxCodeBlock-GroupsPerTransportBlock field. Subfield 520-a, which may contain half or a variable number of bits of DCI field 515-a, may indicate CBGTI information related to a first CW and subfield 520-b, which may contain the remaining bits, may indicate the CBGTI information related to a second CW. It should be noted that subfield 520-a and subfield 520-b may contain nonequal values. Additionally or alternatively, the number of bits for the DCI field 515-a may be increased, which may allow for more larger max CBGs for each CW, or separate DCI fields 515 may be configured for CBGTI associated with the first CW (e.g., DCI field 515-a) and CBGTI associated with the second CW (e.g., DCI field 515-b). It should be noted, as described herein, that CBGTI associated with a CW may be used by the first and second TRPs 105 (e.g., if different layers of the CW are being transmitted by each TRP 105) or may be used by just one TRP 105 (e.g., if a single TRP is transmitting the CW).

In another example, the UE 115 may interpret one or more RV fields differently if the TCI field 510 refers to multiple TCI states, or the TCI states indicate multiple QCL relationships (e.g., two) and if multiple CWs are to be transmitted. In one example, subfield 520-a, which may contain half of the bits of DCI field 515-a, may indicate an RV for a first CW, and subfield 520-b, which may contain the remaining bits, may indicate the RV for a second CW. That is, DCI field 515-a may indicate multiple RVs, which may correspond to multiple CWs, TRPs, or both. Additionally or alternatively, the number of bits for the DCI field 515-a may be increased, which may allow for more RVs for each CW, or separate DCI fields 515 may be configured for RVs associated with the first CW (e.g., DCI field 515-a) and RVs associated with the second CW (e.g., DCI field 515-b). It should be noted, as described herein, that RVs associated with a CW may be used by the first and second TRPs 105 (e.g., if different layers of the CW are being transmitted by each TRP 105) or may be used by just one TRP 105 (e.g., if a single TRP is transmitting the CW).

Figure 6:
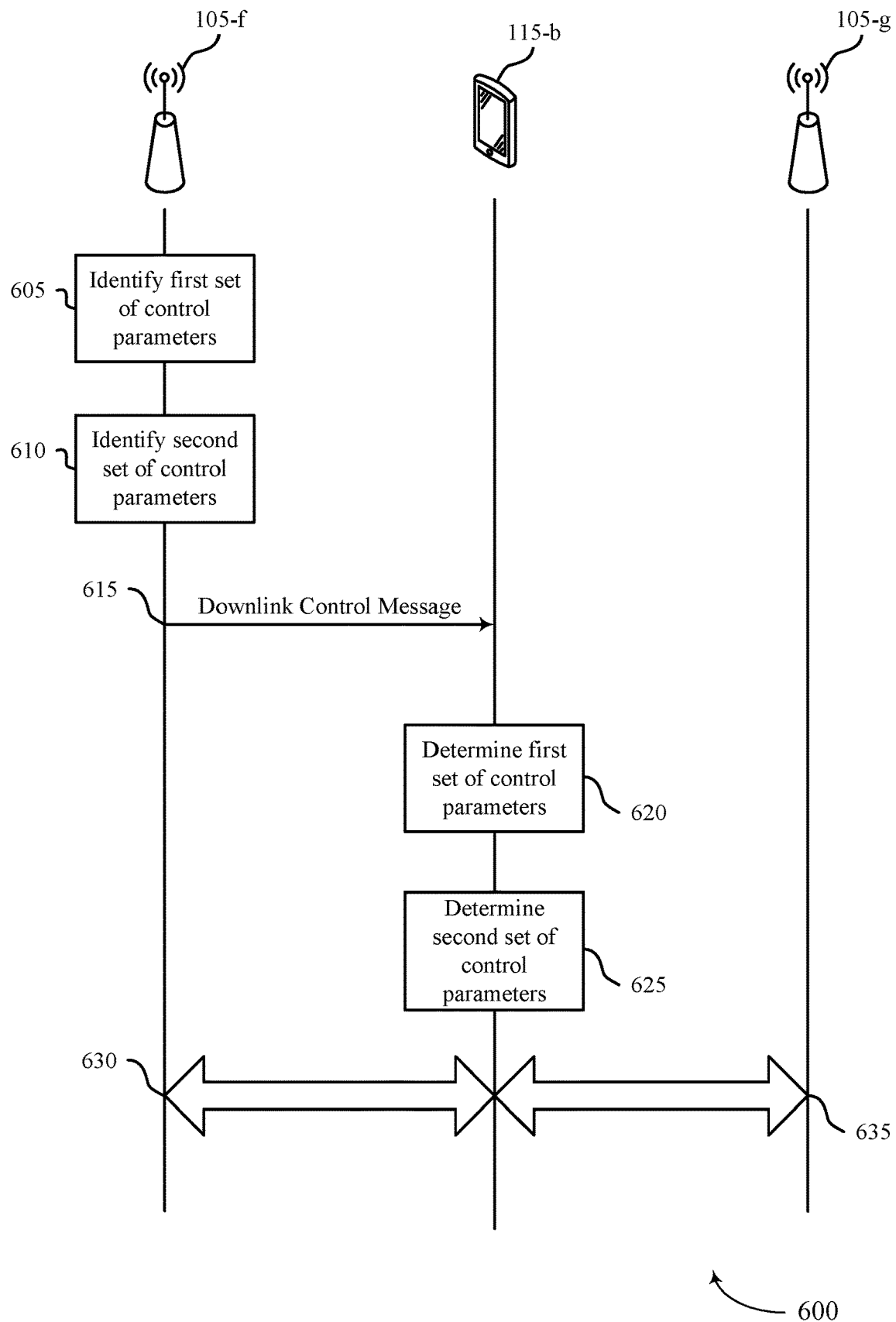
FIG. 6 illustrates an example of a process flow that supports flexible control information for wireless communications in accordance with one or more aspects of the present disclosure.

FIG. 6 illustrates an example of a process flow 600 that supports flexible control information for wireless communications in accordance with one or more aspects of the present disclosure. In some examples, process flow 600 may implement aspects of wireless communications systems 100 and 200. For instance, process flow 600 may be implemented by TRPs 105-f and 105-g and UE 115-b, which may be examples of TRPs 105 and UEs 115 as described with reference to wireless communications systems 100 and 200.

At 605, TRP 105-f may identify a first set of one or more control parameters for communication with UE 115-b. The control parameters may be related to time domain resource assignment, rate matching, ZP CSI-RS triggering, HARQ processes, CBGTI, or a combination of these.

At 610, TRP 105-f may identify a second set of one or more control parameters for communication between UE 115-b and TRP 105-g. The control parameters may be related to time domain resource assignment, rate matching, ZP CSI-RS triggering, HARQ processes, CBGTI, or a combination of these. The first and second set of one or more control parameters may be of the same type (e.g., both may refer to time domain resource assignment), but may refer to values which may be different for each TRP 105 (e.g., the first set of one or more control parameters may refer to time domain resource assignments for TRP 105-f and the second set of one or more control parameters may refer to time domain resource assignments for TRP 105-g). In some cases, the first set of one or more control parameters and the second set of one or more control parameters may provide explicit configurations for each TRP 105. In other cases, the first set of one or more control parameters may make up a baseline configuration (e.g., a configuration for TRP 105-f) and a delta (e.g., a set of offsets from the baseline configuration which may represent the configuration for TRP 105-g).

At 615, TRP 105-f may transmit a downlink control message to UE 115-b. The downlink control message may include a TCI field indicating one or more TCI states identifying multiple QCL relationships for UE 115-b. Additionally or alternatively, the downlink control message may include an indication of the first set of parameters and the second set of parameters. The indication may be included within a same set of bits of the downlink control message (e.g., a single set of bits may indicate both the first set of parameters and the second) or a same set of bits of the same field (e.g., a single field may indicate both the first set of parameters and the second). For instance, the indication of the first set of one or more control parameters may be within a first subset of the set of bits of the same field and the indication of the second set of one or more control parameters may be within a second subset of the set of bits of the same field.

At 620, UE 115-b may determine the first set of one or more control parameters for communication with TRP 105-f based on the received downlink control message. Determining the first set of one or more control parameters may involve finding the indication of the first set of one or more control parameters within the DCI and looking up control parameter values in a preconfigured table.

At 625, UE 115-b may determine the second set of one or more control parameters for communication with TRP 105-g based on the received downlink control message. Determining the second set of one or more control parameters may involve finding the indication of the second set of one or more control parameters within the DCI looking up control parameter values in a preconfigured table, which may be the same table as that for the first set of one or more control parameters or may be a different one.

At 630, UE 115-b may communicate with TRP 105-f. Communication may involve TRP 105-f transmitting one or more CWs or layers of a PDSCH to UE 115-b.

At 635, UE 115-b may communicate with TRP 105-g. Communication may involve TRP 105-g transmitting one or more CWs or layers of a PDSCH to UE 115-b. In some cases, TRP 105-f and TRP 105-g may each transmit different CWs. In other cases, TRP 105-f and TRP 105-g may each transmit one or more layers of each CW.

Figure 7:
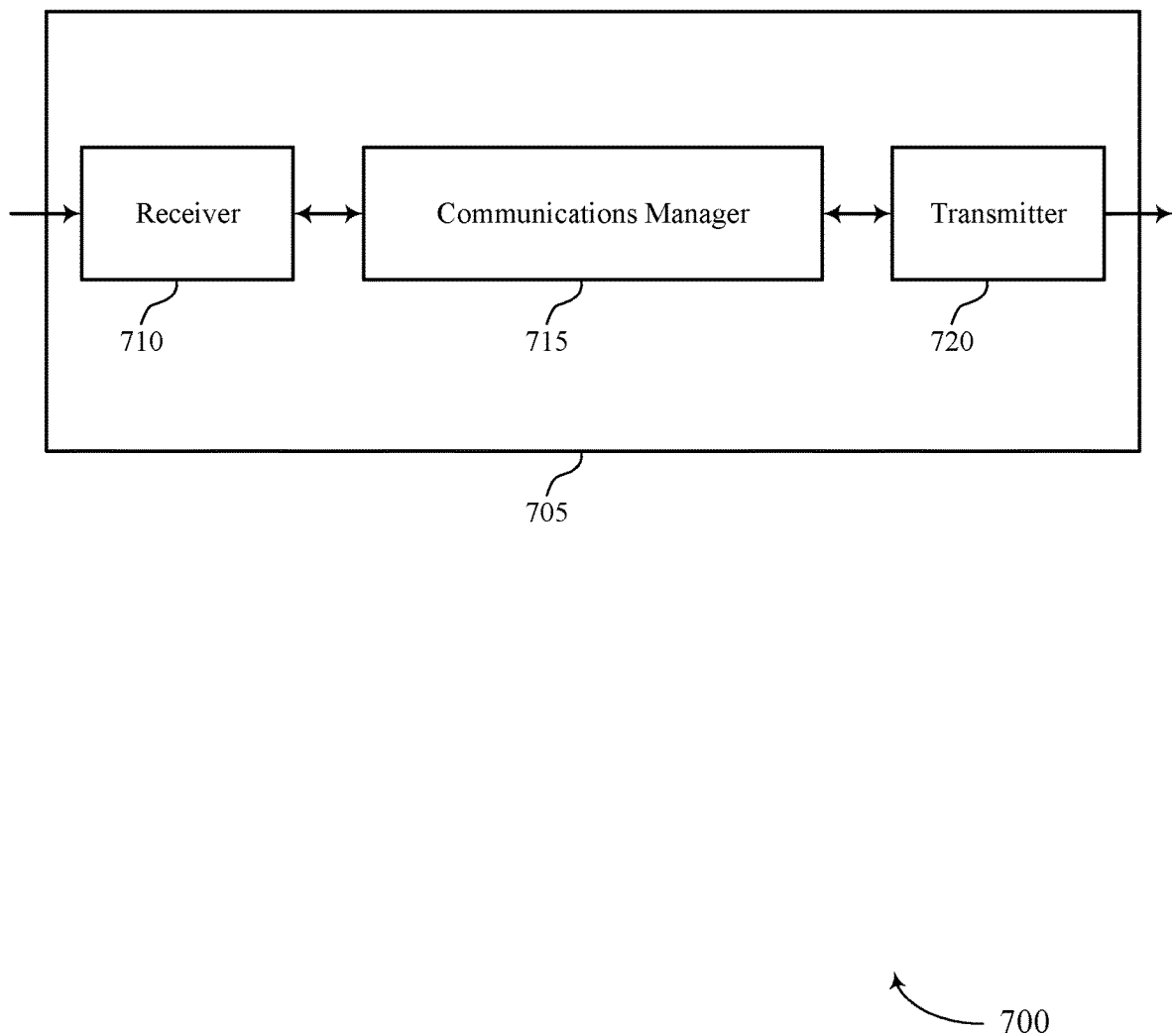
FIGS. 7 and 8 show block diagrams of devices that support flexible control information for wireless communications in accordance with one or more aspects of the present disclosure.

FIG. 7 shows a block diagram 700 of a device 705 that supports flexible control information for wireless communications in accordance with one or more aspects of the present disclosure. The device 705 may be an example of aspects of a UE 115 as described herein. The device 705 may include a receiver 710, a communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to flexible control information for wireless communications). Information may be passed on to other components of the device 705. The receiver 710 may be an example of aspects of the transceiver 1020 described with reference to FIG. 10. The receiver 710 may utilize a single antenna or a set of antennas.

The communications manager 715 may receive, from a first network device, a downlink control message that indicates multiple TCI states and determine a first set of one or more control parameters for communication with the first network device based on the downlink control message. The communications manager 715 may determine a second set of one or more control parameters for communication with a second network device based on the downlink control message, and communicate with the first network device and the second network device based on the respective first set of one or more control parameters and the second set of one or more control parameters. The communications manager

715 may be an example of aspects of the communications manager 1010 described herein.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

The communications manager 715 as described herein may be implemented to realize one or more potential advantages. One implementation may allow the device 705 to more flexibly coordinate communication between a set of one or more TRPs and the device 705, and more specifically to schedule downlink communications from the device 705 to one or more TRPs.

Based on implementing the flexible control information techniques as described herein, a processor of a UE 115 (e.g., controlling the receiver 710, the transmitter 720, or the transceiver 1020 as described with reference to FIG. 10) may increase flexibility in PDSCH scheduling and more efficiently utilize resources because more than one PDCCH may be used for scheduling.

Figure 8:
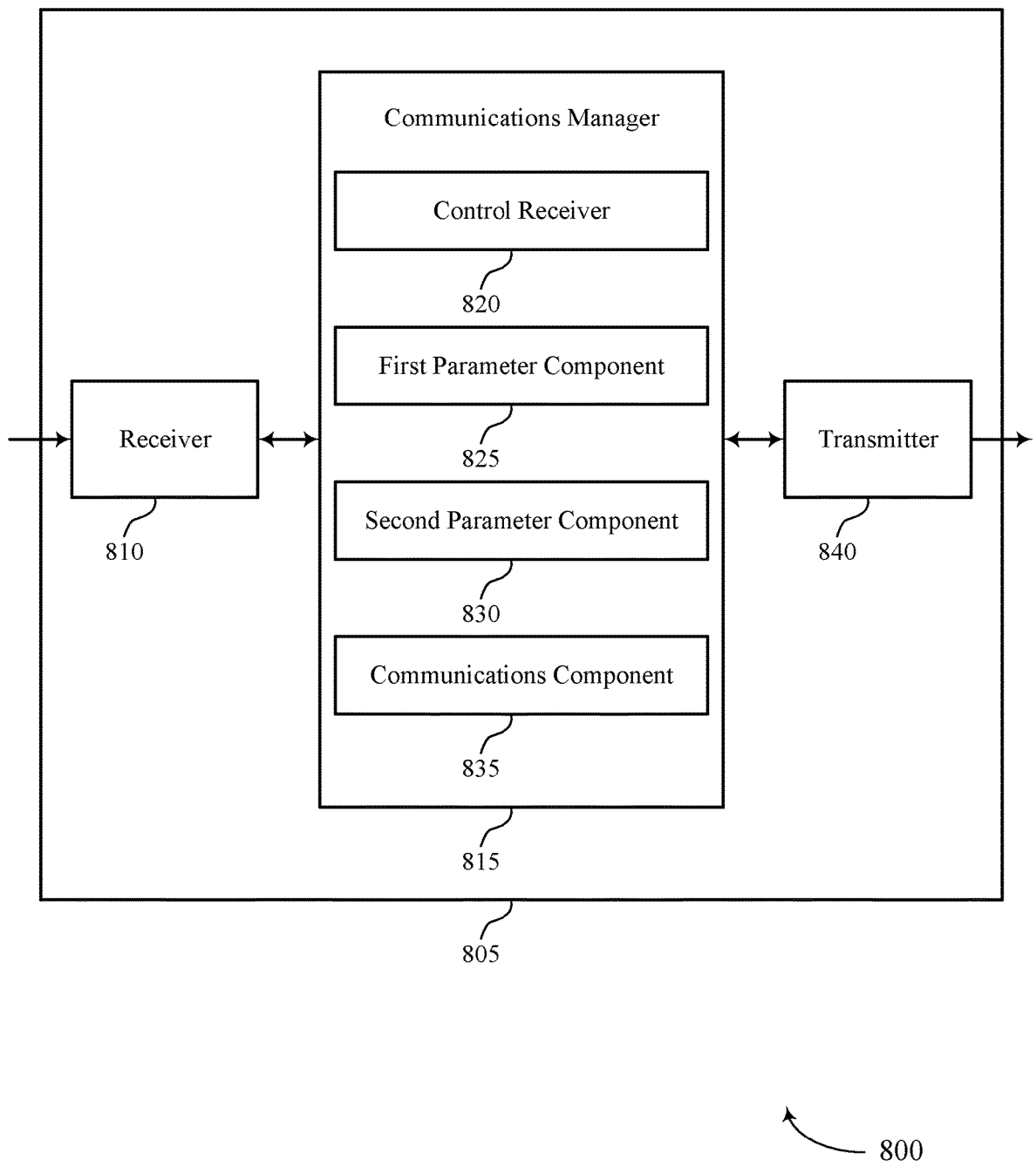

FIG. 8 shows a block diagram 800 of a device 805 that supports flexible control information for wireless communications in accordance with one or more aspects of the present disclosure. The device 805 may be an example of aspects of a device 705, or a UE 115 as described herein. The device 805 may include a receiver 810, a communications manager 815, and a transmitter 840. The device 805 may also include a processor. Each of these components may be in communication with one another (e.g., via one or more buses).

The receiver 810 may receive information such as packets, user data, or control information associated with various information channels (e.g., control channels, data channels, and information related to flexible control information for wireless communications). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include a control receiver 820, a first parameter component 825, a second parameter component 830, and a communications component 835. The communications manager 815 may be an example of aspects of the communications manager 1010 described herein.

The control receiver 820 may receive, from a first network device, a downlink control message that indicates multiple TCI states. In some cases, the downlink control message includes a TCI field identifying multiple TCI states for the UE. In some cases, the multiple TCI state may identifying multiple QCL relationships.

The first parameter component 825 may determine a first set of one or more control parameters for communication with the first network device based on the downlink control message.

The second parameter component 830 may determine a second set of one or more control parameters for communication with a second network device based on the downlink control message. In some cases, the second set of one or more control parameters is different from the first set of one or more control parameters.

The communications component 835 may communicate with the first network device and the second network device based on the respective first set of one or more control parameters and the second set of one or more control parameters.

The transmitter 840 may transmit signals generated by other components of the device 805. In some examples, the transmitter 840 may be collocated with a receiver 810 in a transceiver module. For example, the transmitter 840 may be an example of aspects of the transceiver 1020 described with reference to FIG. 10. The transmitter 840 may utilize a single antenna or a set of antennas.

Figure 9:
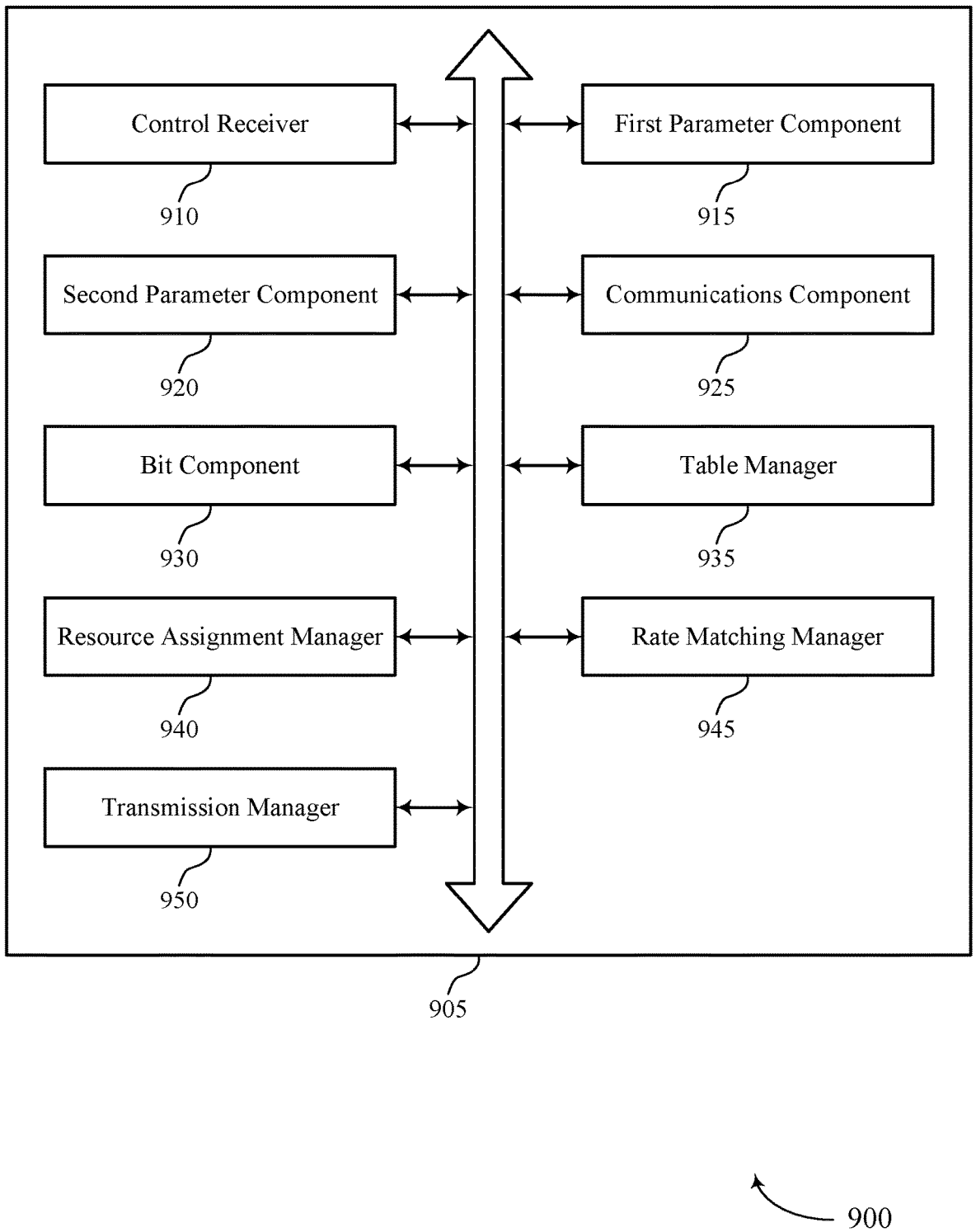
FIG. 9 shows a block diagram of a communications manager that supports flexible control information for wireless communications in accordance with one or more aspects of the present disclosure.

FIG. 9 shows a block diagram 900 of a communications manager 905 that supports flexible control information for wireless communications in accordance with one or more aspects of the present disclosure. The communications manager 905 may be an example of aspects of a communications manager 715, a communications manager 815, or a communications manager 1010 described herein. The communications manager 905 may include a control receiver 910, a first parameter component 915, a second parameter component 920, a communications component 925, a bit component 930, a table manager 935, a resource assignment manager 940, a rate matching manager 945, and a transmission manager 950. Each of these modules may communicate, directly or indirectly, with one another (e.g., via one or more buses).

The control receiver 910 may receive, from a first network device, a downlink control message that indicates multiple TCI states. In some cases, the downlink control message includes a TCI field indicating multiple TCI states for the UE. In some cases, the multiple TCI states may identifying multiple QCL relationships for the UE.

The first parameter component 915 may determine a first set of one or more control parameters for communication with the first network device based on the downlink control message.

The second parameter component 920 may determine a second set of one or more control parameters for communication with a second network device based on the downlink control message. In some cases, the second set of one or more control parameters is different from the first set of one or more control parameters. In some examples, the second parameter component 920 may determine at least one control parameter of the second set of one or more control parameters based on a delta with respect to a control parameter of the first set of one or more control parameters. In some cases, the second parameter component 920 may determine the delta based on a row-index of a table of control parameters for the first and second network devices. In some aspects, the second parameter component 920 may determine the delta based on a field of the downlink control message separate from one or more fields associated with the first set of one or more control parameters.

The communications component 925 may communicate with the first network device and the second network device based on the respective first set of one or more control parameters and the second set of one or more control parameters.

The bit component 930 may determine the first set of one or more control parameters and the second set of one or more control parameters based on a same set of bits of the downlink control message. In some examples, the bit component 930 may determine the first set of one or more control parameters and the second set of one or more control parameters based on a set of bits of a same field of the downlink control message. In some examples, the bit component 930 may determine the first set of one or more control parameters based on a first set of bits of the downlink control message. In some cases, the bit component 930 may determine the second set of one or more control parameters based on a second set of bits of the downlink control message non-overlapping with the first set of bits. In some aspects, the first set of one or more control parameters is determined based on a first subset of the set of bits of the same field. In some instances, the second set of one or more control parameters is determined based on a second subset of the set of bits of the same field. In some cases, the first and second sets of bits are associated with different fields of the downlink control message.

The table manager 935 may determine the first set of one or more control parameters and the second set of one or more control parameters based on a same table of control parameters for the first network device and the second network device. In some examples, the table manager 935 may determine the first set of one or more control parameters based on a first table of control parameters associated with the first network device. In some cases, the table manager 935 may determine the second set of one or more control parameters based on a second table of control parameters associated with the second network device.

The resource assignment manager 940 may identify a first resource assignment of the first set of one or more control parameters for communication with the first network device based on at least one resource assignment field of the downlink control message. In some examples, the resource assignment manager 940 may identify a second resource assignment of the second set of one or more control parameters for communication with the second network device, where the first and second resource assignments include different SLIVs, different mapping types, or both. In some cases, the resource assignment manager 940 may determine the first resource assignment based on a first set of bits of the at least one resource assignment field. In some aspects, the resource assignment manager 940 may determine the second resource assignment based on a second set of bits of the at least one resource assignment field. In some instances, the first set of bits points to a row of parameters within a first resource assignment table.

In some cases, the first resource assignment is determined based on the row of parameters within the first resource assignment table. In some examples, the second set of bits points to a row of parameters within a second resource assignment table. In some aspects, the second resource assignment is determined based on the row of parameters within the second resource assignment table. In some instances, the first and second resource assignment tables are the same. In some cases, the second resource assignment is identified based on a first set of bits of the at least one resource assignment field or a second set of bits non-overlapping with the first set of bits. In some examples, the second resource assignment is identified based on a resource assignment field of the downlink control message that is different from the at least one resource assignment field.

The rate matching manager 945 may identify a first rate matching parameter of the first set of one or more control parameters for communication with the first network device based on at least one rate matching field of the downlink control message. In some examples, the rate matching manager 945 may identify a second rate matching parameter of the second set of one or more control parameters for communication with the second network device, where the first and second rate matching parameters include different RB and symbol level rate matching patterns, different resource element level rate matching patterns, different ZP CSI-RS resource sets, or any combination thereof. In some aspects, the second rate matching parameter is identified based on a first set of bits of the at least one rate matching field or a second set of bits non-overlapping with the first set of bits. In some cases, the first set of bits or the second set of bits correspond to a rate matching pattern of a set of rate matching patterns configured for the UE. In some instances, the second rate matching parameter is identified based on a rate matching field of the downlink control message that is different from the at least one rate matching field.

The transmission manager 950 may identify a first transmission parameter of the first set of one or more control parameters for communication with the first network device based on at least one transmission field of the downlink control message. In some examples, the transmission manager 950 may identify a second transmission parameter of the second set of one or more control parameters for communication with the second network device, where the first and second transmission parameters include different HARQ process IDs, different CBGTI for retransmission associated with multiple CWs, an RV, or any combination thereof. In some cases, the second transmission parameter is identified based on a first set of bits of the at least one transmission field or a second set of bits non-overlapping with the first set of bits. In some aspects, the second transmission parameter is identified based on a transmission field of the downlink control message that is different from the at least one transmission field. In some cases, a number of code block groups for a first CW retransmission is different from a number of code block groups for a second CW retransmission.

Figure 10:
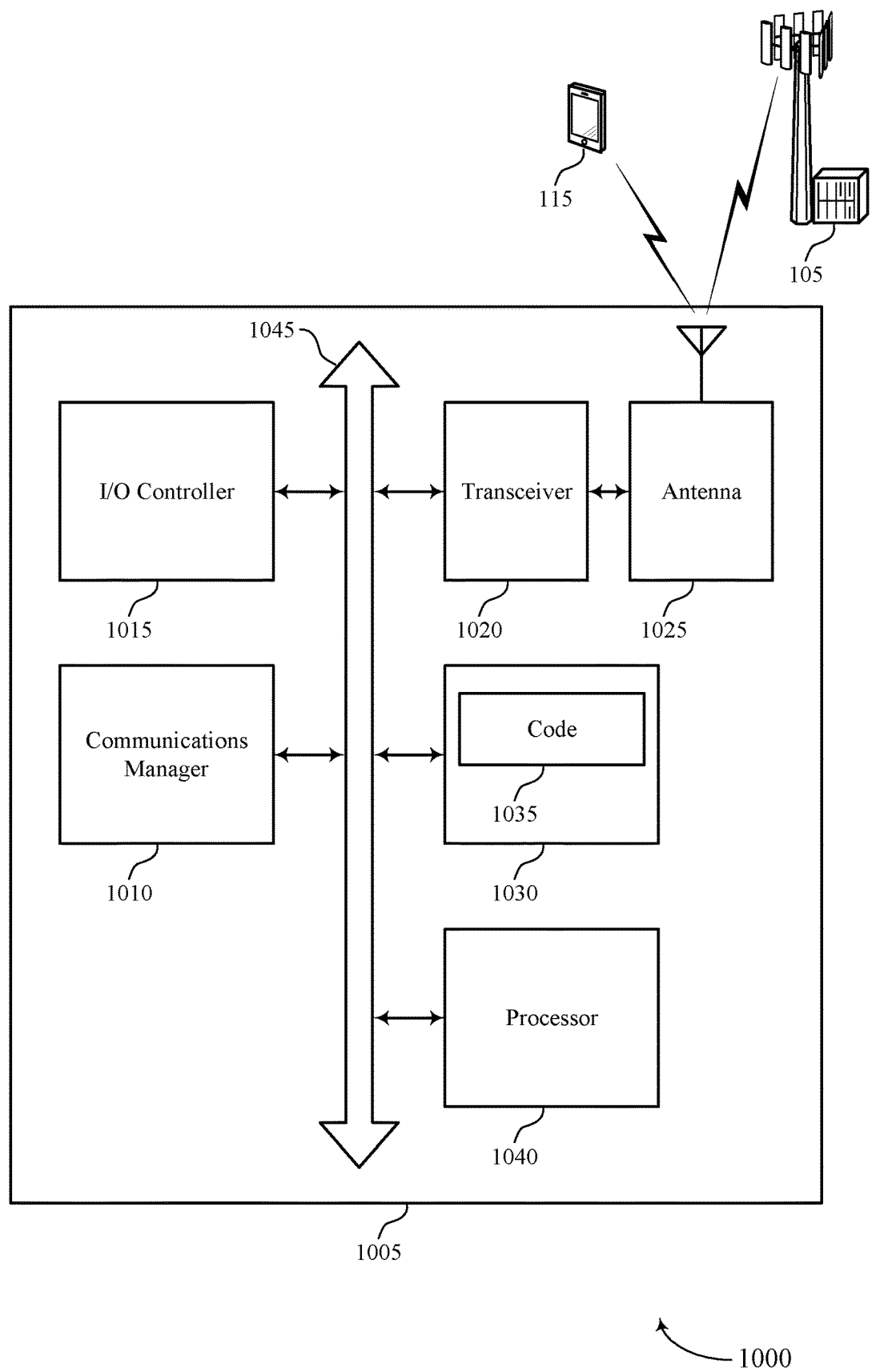
FIG. 10 shows a diagram of a system including a device that supports flexible control information for wireless communications in accordance with one or more aspects of the present disclosure.

FIG. 10 shows a diagram of a system 1000 including a device 1005 that supports flexible control information for wireless communications in accordance with one or more aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (e.g., bus 1045).

The communications manager 1010 may receive, from a first network device, a downlink control message that indicates multiple TCI states and determine a first set of one or more control parameters for communication with the first network device based on the downlink control message. The communications manager 1010 may determine a second set of one or more control parameters for communication with a second network device based on the downlink control message, and communicate with the first network device and the second network device based on the respective first set of one or more control parameters and the second set of one or more control parameters.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described herein. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include random-access memory (RAM) and read-only memory (ROM). The memory 1030 may store computer-readable, computer-executable code 1035 including instructions that, when executed, cause the processor to perform various functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting flexible control information for wireless communications).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
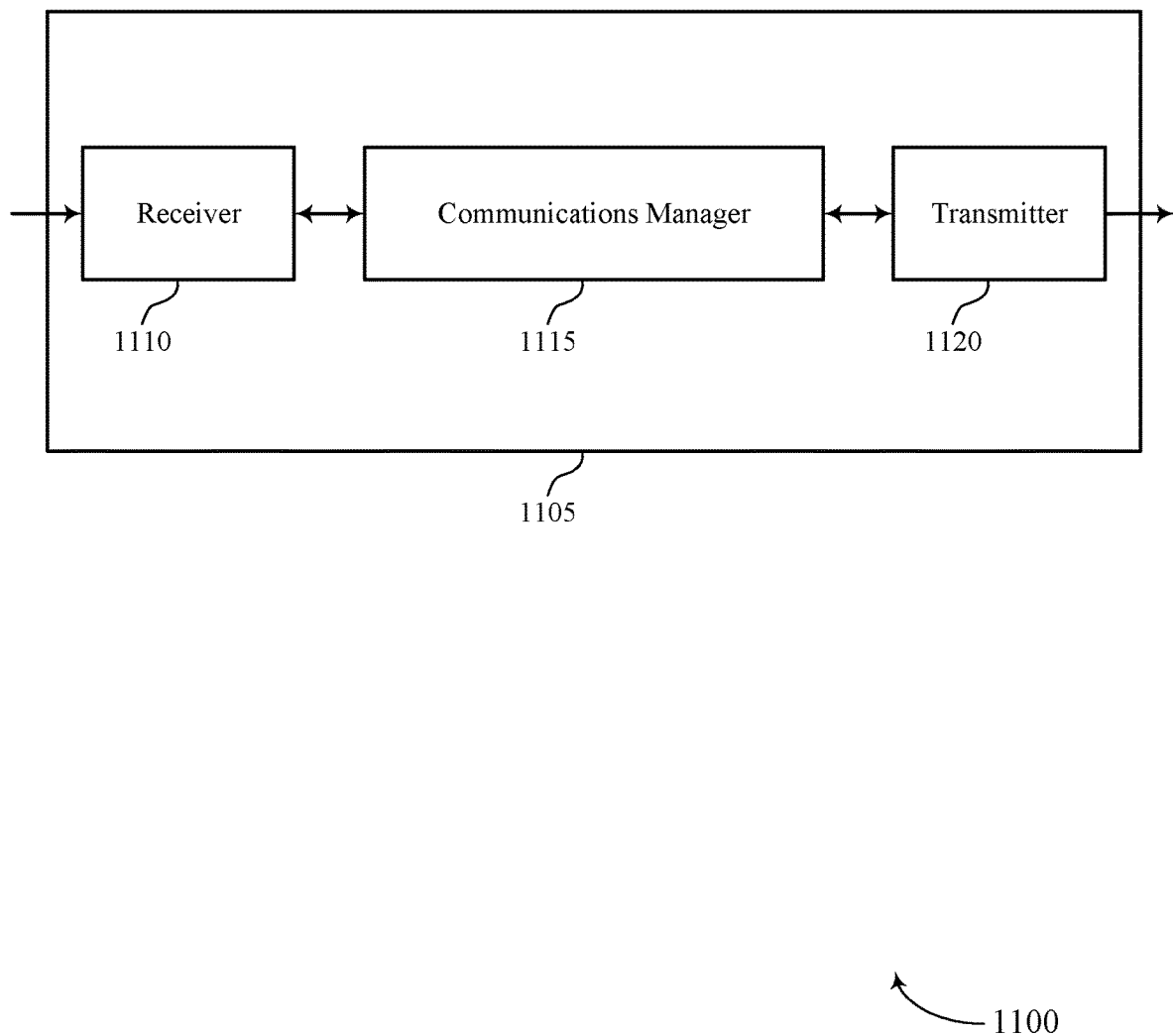
FIGS. 11 and 12 show block diagrams of devices that support flexible control information for wireless communications in accordance with one or more aspects of the present disclosure.

FIG. 11 shows a block diagram 1100 of a device 1105 that supports flexible control information for wireless communications in accordance with one or more aspects of the present disclosure. The device 1105 may be an example of aspects of a base station 105, or TRP 105, or a network device 105 as described herein. The device 1105 may include a receiver 1110, a communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to flexible control information for wireless communications). Information may be passed on to other components of the device 1105. The receiver 1110 may be an example of aspects of the transceiver 1420 described with reference to FIG. 14. The receiver 1110 may utilize a single antenna or a set of antennas.

The communications manager 1115 may identify a first set of one or more control parameters for communication between the first network device and a UE and identify a second set of one or more control parameters for communication between a second network device and the UE. In some cases, the second set of one or more control parameters is different from the first set of one or more control parameters. The communications manager 1115 may transmit a downlink control message to the UE, the downlink control message indicating multiple TCI states and an indication of the first set of one or more control parameters and the second sets of control parameters. The communications manager 1115 may be an example of aspects of the communications manager 1410 described herein.

The communications manager 1115, or its sub-components, may be implemented in hardware, code (e.g., software or firmware) executed by a processor, or any combination thereof. If implemented in code executed by a processor, the functions of the communications manager 1115, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
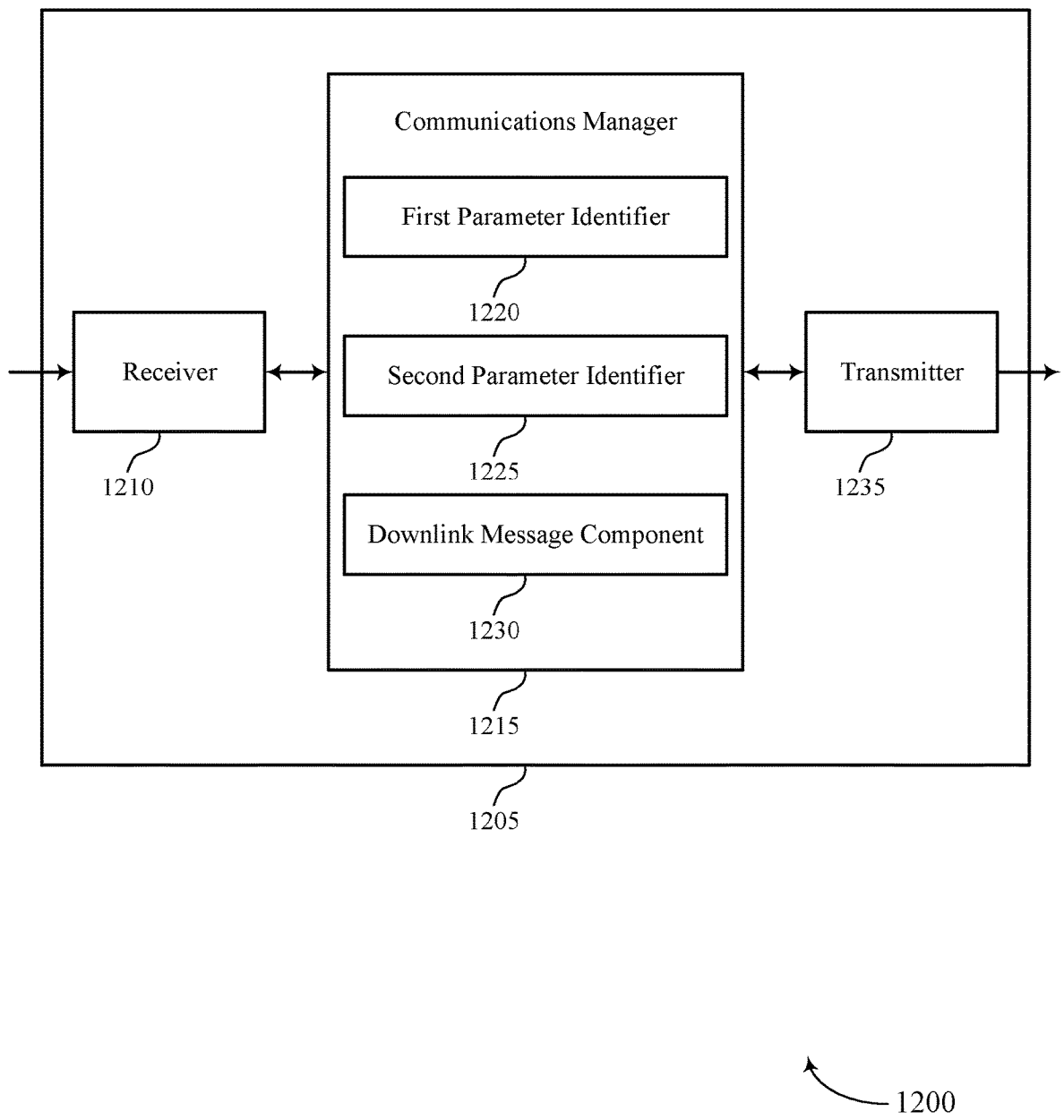

FIG. 12 shows a block diagram 1200 of a device 1205 that supports flexible control information for wireless communications in accordance with one or more aspects of the present disclosure. The device 1205 may be an example of aspects of a device 1105, a base station 105, or a TRP 105, or a network device 105 as described herein. The device 1205 may include a receiver 1210, a communications manager 1215, and a transmitter 1235. The device 1205 may also include a processor. Each of these components may be in communication with one another (e.g., via one or more buses).

The receiver 1210 may receive information such as packets, user data, or control information associated with various information channels (e.g., control channels, data channels, and information related to flexible control information for wireless communications). Information may be passed on to other components of the device 1205. The receiver 1210 may be an example of aspects of the transceiver 1420 described with reference to FIG. 14. The receiver 1210 may utilize a single antenna or a set of antennas.

The communications manager 1215 may be an example of aspects of the communications manager 1115 as described herein. The communications manager 1215 may include a first parameter identifier 1220, a second parameter identifier 1225, and a downlink message component 1230. The communications manager 1215 may be an example of aspects of the communications manager 1410 described herein.

The first parameter identifier 1220 may identify a first set of one or more control parameters for communication between the first network device and a UE.

The second parameter identifier 1225 may identify a second set of one or more control parameters for communication between a second network device and the UE. In some cases, the second set of one or more control parameters is different from the first set of one or more control parameters.

The downlink message component 1230 may transmit a downlink control message to the UE, the downlink control message indicating multiple TCI states and an indication of the first set of one or more control parameters and the second sets of control parameters.

The transmitter 1235 may transmit signals generated by other components of the device 1205. In some examples, the transmitter 1235 may be collocated with a receiver 1210 in a transceiver module. For example, the transmitter 1235 may be an example of aspects of the transceiver 1420 described with reference to FIG. 14. The transmitter 1235 may utilize a single antenna or a set of antennas.

Figure 13:
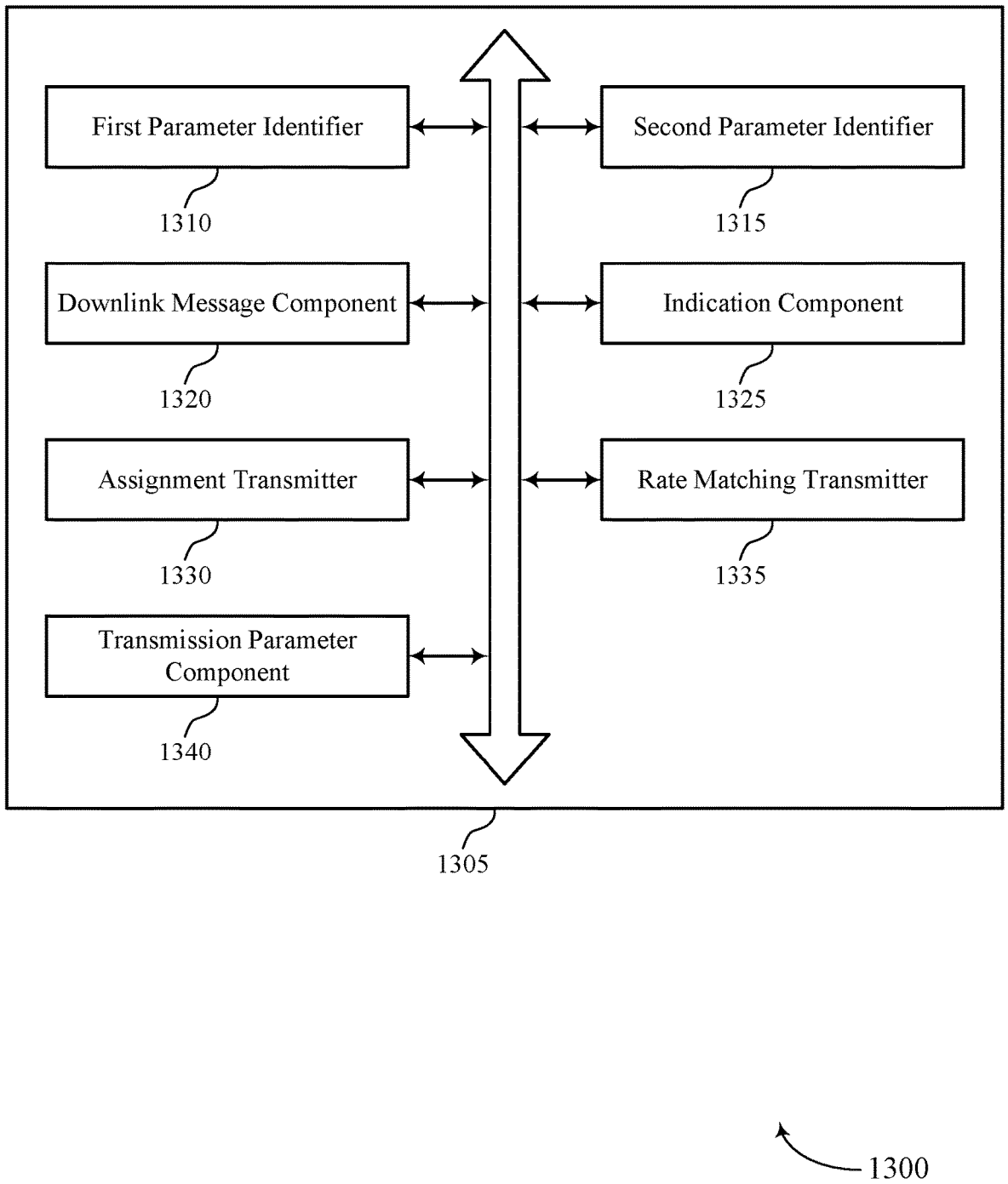
FIG. 13 shows a block diagram of a communications manager that supports flexible control information for wireless communications in accordance with one or more aspects of the present disclosure.

FIG. 13 shows a block diagram 1300 of a communications manager 1305 that supports flexible control information for wireless communications in accordance with one or more aspects of the present disclosure. The communications manager 1305 may be an example of aspects of a communications manager 1115, a communications manager 1215, or a communications manager 1410 described herein. The communications manager 1305 may include a first parameter identifier 1310, a second parameter identifier 1315, a downlink message component 1320, an indication component 1325, an assignment transmitter 1330, a rate matching transmitter 1335, and a transmission parameter component 1340. Each of these modules may communicate, directly or indirectly, with one another (e.g., via one or more buses).

The first parameter identifier 1310 may identify a first set of one or more control parameters for communication between the first network device and a UE.

The second parameter identifier 1315 may identify a second set of one or more control parameters for communication between a second network device and the UE. In some cases, the second set of one or more control parameters is different from the first set of one or more control parameters.

The downlink message component 1320 may transmit a downlink control message to the UE, the downlink control message indicating multiple TCI states and an indication of the first set of one or more control parameters and the second sets of control parameters.

The indication component 1325 may transmit the indication of the first set of one or more control parameters and the second set of one or more control parameters via a same set of bits of the downlink control message. In some examples, the indication component 1325 may transmit the indication of the first set of one or more control parameters and the second set of one or more control parameters via different sets of bits of the downlink control message. In some cases, the indication component 1325 may transmit the indication of the first set of one or more control parameters and the second set of one or more control parameters via a set of bits of a same field of the downlink control message. In some aspects, the indication component 1325 may transmit the indication of the first set of one or more control parameters and the second set of one or more control parameters via different fields of the downlink control message. In some instance, the indication component 1325 may transmit the indication of the first set of one or more control parameters and the second set of one or more control parameters based on a delta between a control parameter of the first set of one or more control parameters and a control parameter of the second set of one or more control parameters. In some cases, the first set of one or more control parameters is indicated via a first subset of the set of bits of the same field. In some examples, the second set of one or more control parameters is indicated via a second subset of the set of bits of the same field.

The assignment transmitter 1330 may transmit a first resource assignment of the first set of one or more control parameters for communication with the first network device via at least one resource assignment field of the downlink control message. In some examples, the assignment transmitter 1330 may transmit a second resource assignment of the second set of one or more control parameters for communication with the second network device, where the first and second resource assignments include different SLIVs, different mapping types, or both. In some cases, the assignment transmitter 1330 may transmit the second resource assignment via a first set of bits of the at least one resource assignment field or a second set of bits non-overlapping with the first set of bits. In some instances, the assignment transmitter 1330 may transmit the second resource assignment via a resource assignment field of the downlink control message that is different from the at least one resource assignment field.

The rate matching transmitter 1335 may transmit a first rate matching parameter of the first set of one or more control parameters for communication with the first network device via at least one rate matching field of the downlink control message. In some examples, the rate matching transmitter 1335 may transmit a second rate matching parameter of the second set of one or more control parameters for communication with the second network device, where the first and second rate matching parameters include different RB and symbol level rate matching patterns, different resource element level rate matching patterns, different ZP CSI-RS resource sets, or any combination thereof. In some cases, the rate matching transmitter 1335 may transmit the second rate matching parameter via a first set of bits of the at least one rate matching field or a second set of bits non-overlapping with the first set of bits. In some aspects, the rate matching transmitter 1335 may transmit the second rate matching parameter via a rate matching field of the downlink control message that is different from the at least one rate matching field.

The transmission parameter component 1340 may transmit a first transmission parameter of the first set of one or more control parameters for communication with the first network device via at least one transmission field of the downlink control message. In some examples, the transmission parameter component 1340 may transmit a second transmission parameter of the second set of one or more control parameters for communication with the second network device, where the first and second transmission parameters include different HARQ process IDs, different CBGTI for retransmission associated with multiple CWs, an RV, or any combination thereof. In some cases, the transmission parameter component 1340 may transmit the second transmission parameter via a first set of bits of the at least one transmission field or a second set of bits non-overlapping with the first set of bits. In some instances, the transmission parameter component 1340 may transmit the second transmission parameter via a transmission field of the downlink control message that is different from the at least one transmission field. In some cases, a number of code block groups for a first CW retransmission is different from a number of code block groups for a second CW retransmission.

Figure 14:
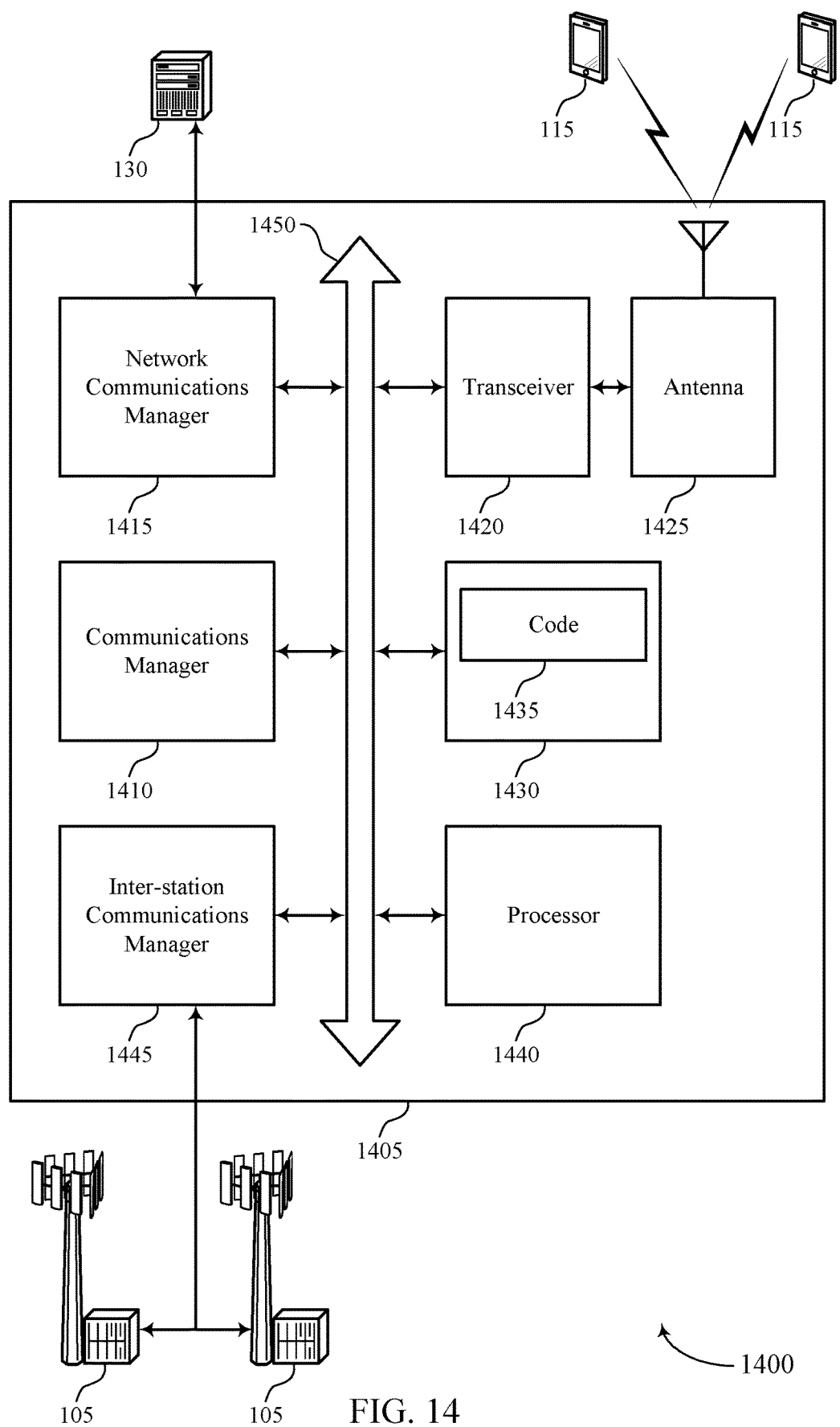
FIG. 14 shows a diagram of a system including a device that supports flexible control information for wireless communications in accordance with one or more aspects of the present disclosure.

FIG. 14 shows a diagram of a system 1400 including a device 1405 that supports flexible control information for wireless communications in accordance with one or more aspects of the present disclosure. The device 1405 may be an example of or include the components of device 1105, device 1205, a base station 105, or a TRP 105, or a network device 105 as described herein. The device 1405 may include components for bi-directional voice and data communications including components for transmitting and receiving communications, including a communications manager 1410, a network communications manager 1415, a transceiver 1420, an antenna 1425, memory 1430, a processor 1440, and an inter-station communications manager 1445. These components may be in electronic communication via one or more buses (e.g., bus 1450).

The communications manager 1410 may identify a first set of one or more control parameters for communication between the first network device and a UE, identify a second set of one or more control parameters for communication between a second network device and the UE, and transmit a downlink control message to the UE, the downlink control message indicating multiple TCI states and an indication of the first set of one or more control parameters and the second sets of control parameters.

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described herein. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device 1405 to perform various functions (e.g., functions or tasks supporting flexible control information for wireless communications).

The inter-station communications manager 1445 may manage communications with other base stations 105, TRPs 105, or a combination thereof and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
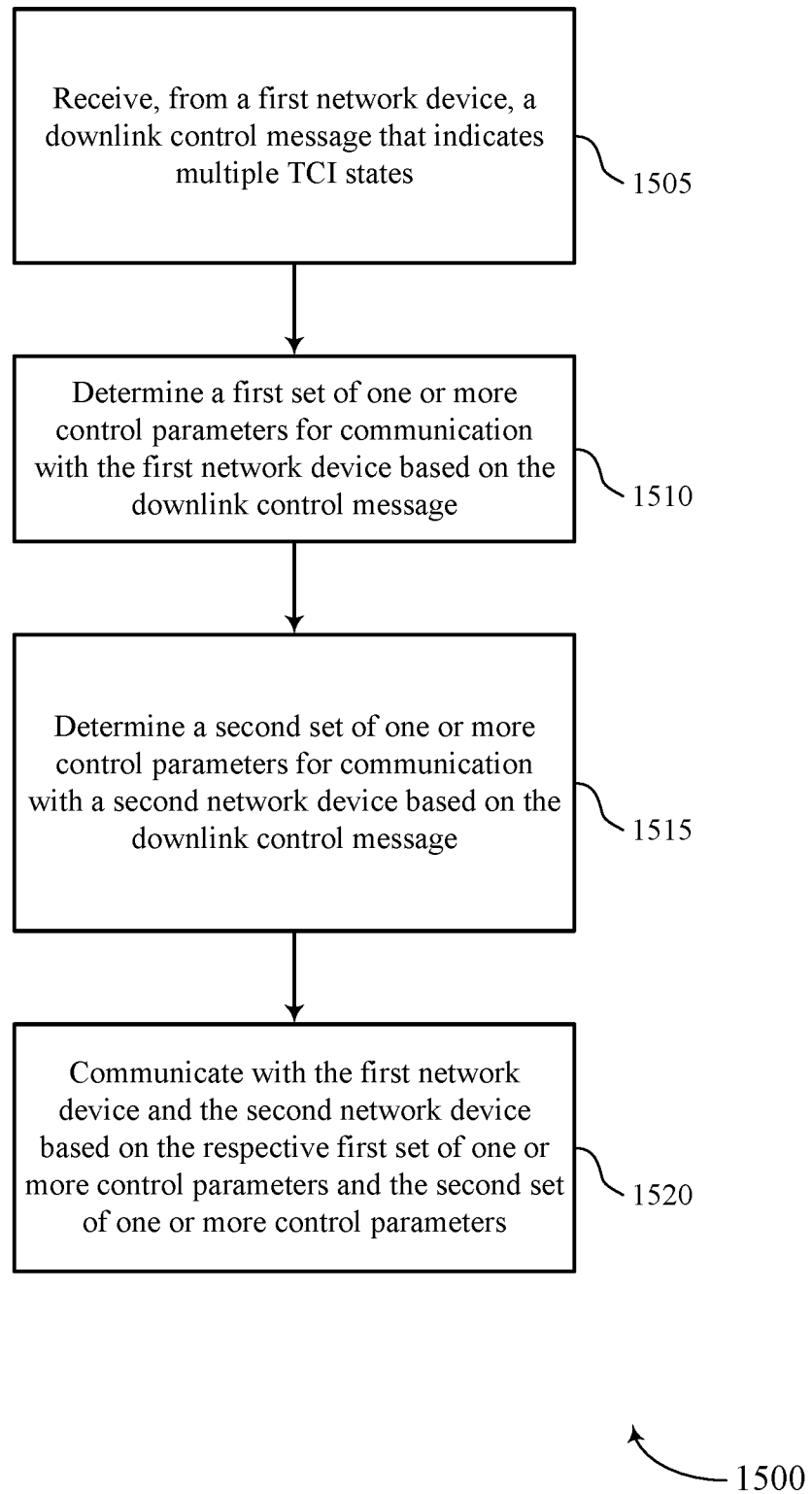
FIGS. 15 through 22 show flowcharts illustrating methods that support flexible control information for wireless communications in accordance with one or more aspects of the present disclosure.

FIG. 15 shows a flowchart illustrating a method 1500 that supports flexible control information for wireless communications in accordance with one or more aspects of the present disclosure. The operations of method 1500 may be implemented by a UE 115 or its components as described herein. For example, the operations of method 1500 may be performed by a communications manager as described with reference to FIGS. 7 through 10. In some examples, a UE may execute a set of instructions to control the functional elements of the UE to perform the functions described herein. Additionally or alternatively, a UE may perform aspects of the functions described herein using special-purpose hardware.

At 1505, the UE may receive, from a first network device, a downlink control message that indicates multiple TCI states. In some cases, the downlink control message includes a TCI field indicating multiple TCI states for the UE. In some cases, the multiple TCI states may identify multiple QCL relationships for the UE. The operations of 1505 may be performed according to the methods described herein. In some examples, aspects of the operations of 1505 may be performed by a control receiver as described with reference to FIGS. 7 through 10.

At 1510, the UE may determine a first set of one or more control parameters for communication with the first network device based on the downlink control message. The operations of 1510 may be performed according to the methods described herein. In some examples, aspects of the operations of 1510 may be performed by a first parameter component as described with reference to FIGS. 7 through 10.

At 1515, the UE may determine a second set of one or more control parameters for communication with a second network device based on the downlink control message. In some cases, the second set of one or more control parameters is different from the first set of one or more control parameters. The operations of 1515 may be performed according to the methods described herein. In some examples, aspects of the operations of 1515 may be performed by a second parameter component as described with reference to FIGS. 7 through 10.

At 1520, the UE may communicate with the first network device and the second network device based on the respective first set of one or more control parameters and the second set of one or more control parameters. The operations of 1520 may be performed according to the methods described herein. In some examples, aspects of the operations of 1520 may be performed by a communications component as described with reference to FIGS. 7 through 10.

Figure 16:
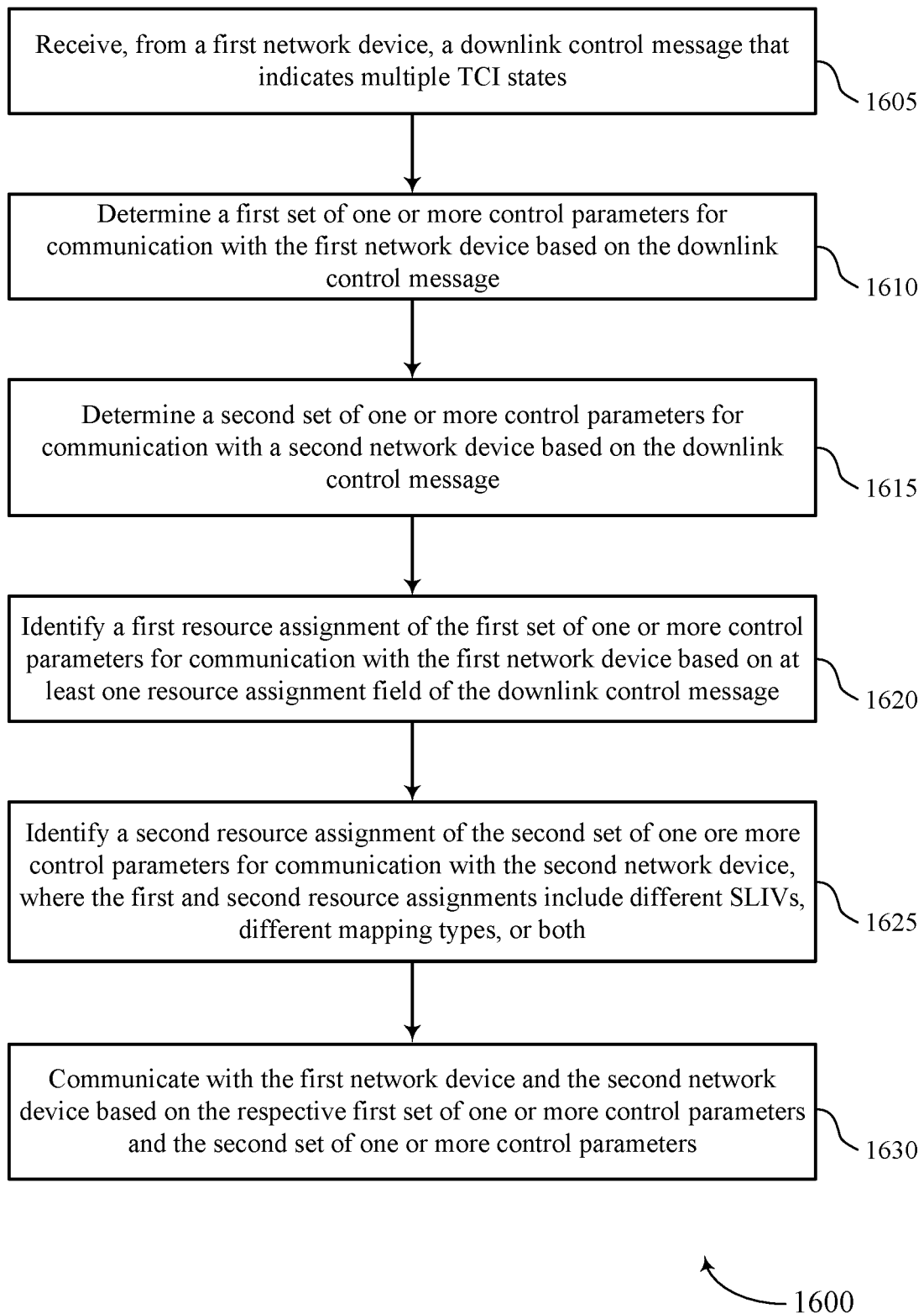

FIG. 16 shows a flowchart illustrating a method 1600 that supports flexible control information for wireless communications in accordance with one or more aspects of the present disclosure. The operations of method 1600 may be implemented by a UE 115 or its components as described herein. For example, the operations of method 1600 may be performed by a communications manager as described with reference to FIGS. 7 through 10. In some examples, a UE may execute a set of instructions to control the functional elements of the UE to perform the functions described herein. Additionally or alternatively, a UE may perform aspects of the functions described herein using special-purpose hardware.

At 1605, the UE may receive, from a first network device, a downlink control message that indicates multiple TCI states. In some cases, the downlink control message includes a TCI field indicating multiple TCI states. In some cases, the TCI states identify multiple QCL relationships for the UE. The operations of 1605 may be performed according to the methods described herein. In some examples, aspects of the operations of 1605 may be performed by a control receiver as described with reference to FIGS. 7 through 10.

At 1610, the UE may determine a first set of one or more control parameters for communication with the first network device based on the downlink control message. The operations of 1610 may be performed according to the methods described herein. In some examples, aspects of the operations of 1610 may be performed by a first parameter component as described with reference to FIGS. 7 through 10.

At 1615, the UE may determine a second set of one or more control parameters for communication with a second network device based on the downlink control message. In some cases, the second set of one or more control parameters is different from the first set of one or more control parameters. The operations of 1615 may be performed according to the methods described herein. In some examples, aspects of the operations of 1615 may be performed by a second parameter component as described with reference to FIGS. 7 through 10.

At 1620, the UE may identify a first resource assignment of the first set of one or more control parameters for communication with the first network device based on at least one resource assignment field of the downlink control message. The operations of 1620 may be performed according to the methods described herein. In some examples, aspects of the operations of 1620 may be performed by a resource assignment manager as described with reference to FIGS. 7 through 10.

At 1625, the UE may identify a second resource assignment of the second set of one or more control parameters for communication with the second network device, where the first and second resource assignments include different SLIVs, different mapping types, or both. The operations of 1625 may be performed according to the methods described herein. In some examples, aspects of the operations of 1625 may be performed by a resource assignment manager as described with reference to FIGS. 7 through 10.

At 1630, the UE may communicate with the first network device and the second network device based on the respective first set of one or more control parameters and the second set of one or more control parameters. The operations of 1630 may be performed according to the methods described herein. In some examples, aspects of the operations of 1630 may be performed by a communications component as described with reference to FIGS. 7 through 10.

Figure 17:
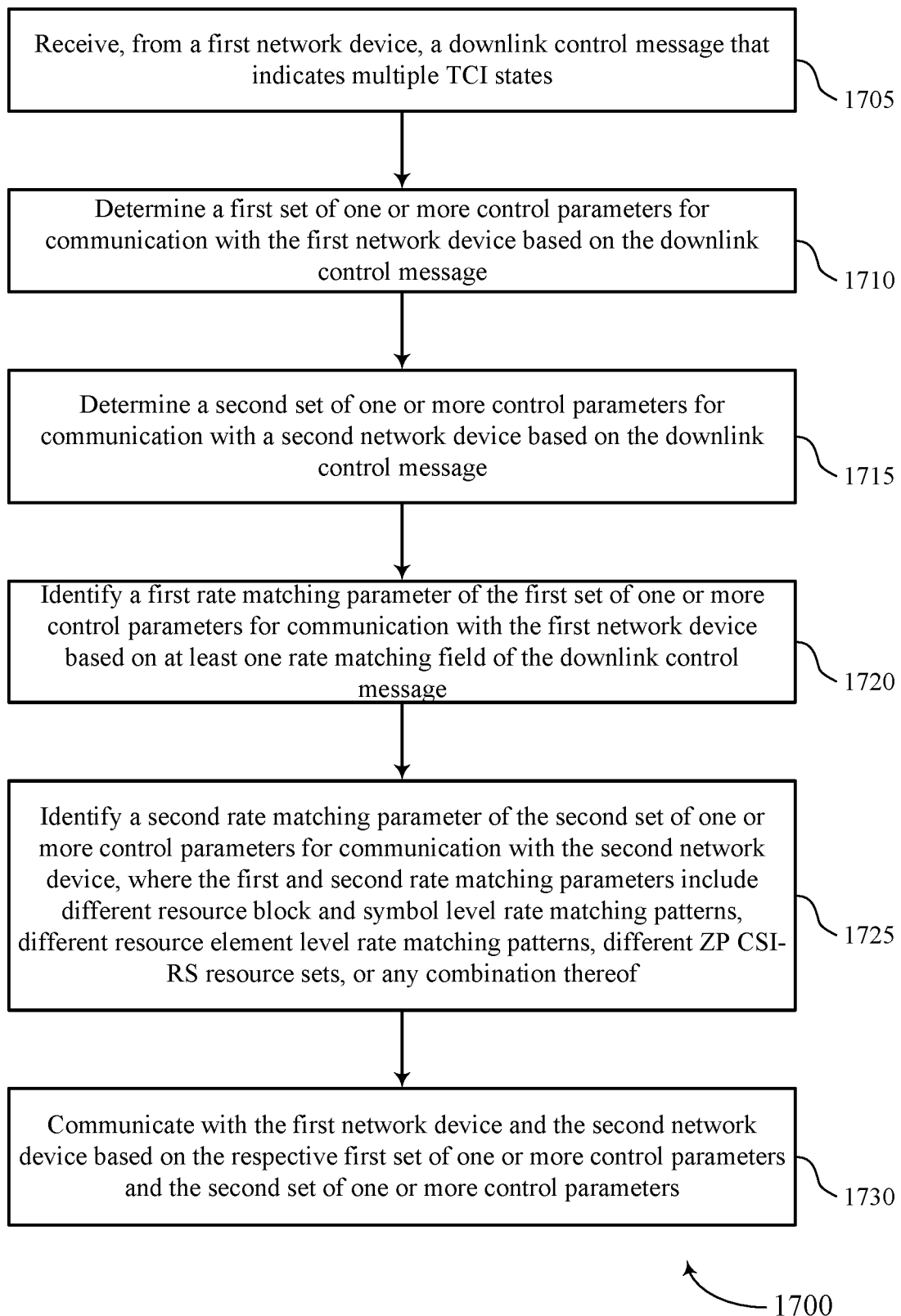

FIG. 17 shows a flowchart illustrating a method 1700 that supports flexible control information for wireless communications in accordance with one or more aspects of the present disclosure. The operations of method 1700 may be implemented by a UE 115 or its components as described herein. For example, the operations of method 1700 may be performed by a communications manager as described with reference to FIGS. 7 through 10. In some examples, a UE may execute a set of instructions to control the functional elements of the UE to perform the functions described herein. Additionally or alternatively, a UE may perform aspects of the functions described herein using special-purpose hardware.

At 1705, the UE may receive, from a first network device, a downlink control message that indicates multiple TCI states. In some cases, the downlink control message includes a TCI fields indicating multiple TCI states. In some cases, the multiple TCI states identify multiple QCL relationships for the UE. The operations of 1705 may be performed according to the methods described herein. In some examples, aspects of the operations of 1705 may be performed by a control receiver as described with reference to FIGS. 7 through 10.

At 1710, the UE may determine a first set of one or more control parameters for communication with the first network device based on the downlink control message. The operations of 1710 may be performed according to the methods described herein. In some examples, aspects of the operations of 1710 may be performed by a first parameter component as described with reference to FIGS. 7 through 10.

At 1715, the UE may determine a second set of one or more control parameters for communication with a second network device based on the downlink control message. In some cases, the second set of one or more control parameters is different from the first set of one or more control parameters. The operations of 1715 may be performed according to the methods described herein. In some examples, aspects of the operations of 1715 may be performed by a second parameter component as described with reference to FIGS. 7 through 10.

At 1720, the UE may identify a first rate matching parameter of the first set of one or more control parameters for communication with the first network device based on at least one rate matching field of the downlink control message. The operations of 1720 may be performed according to the methods described herein. In some examples, aspects of the operations of 1720 may be performed by a rate matching manager as described with reference to FIGS. 7 through 10.

At 1725, the UE may identify a second rate matching parameter of the second set of one or more control parameters for communication with the second network device, where the first and second rate matching parameters include different RB and symbol level rate matching patterns, different resource element level rate matching patterns, different (ZP CSI-RS resource sets, or any combination thereof. The operations of 1725 may be performed according to the methods described herein. In some examples, aspects of the operations of 1725 may be performed by a rate matching manager as described with reference to FIGS. 7 through 10.

At 1730, the UE may communicate with the first network device and the second network device based on the respective first set of one or more control parameters and the second set of one or more control parameters. The operations of 1730 may be performed according to the methods described herein. In some examples, aspects of the operations of 1730 may be performed by a communications component as described with reference to FIGS. 7 through 10.

Figure 18:
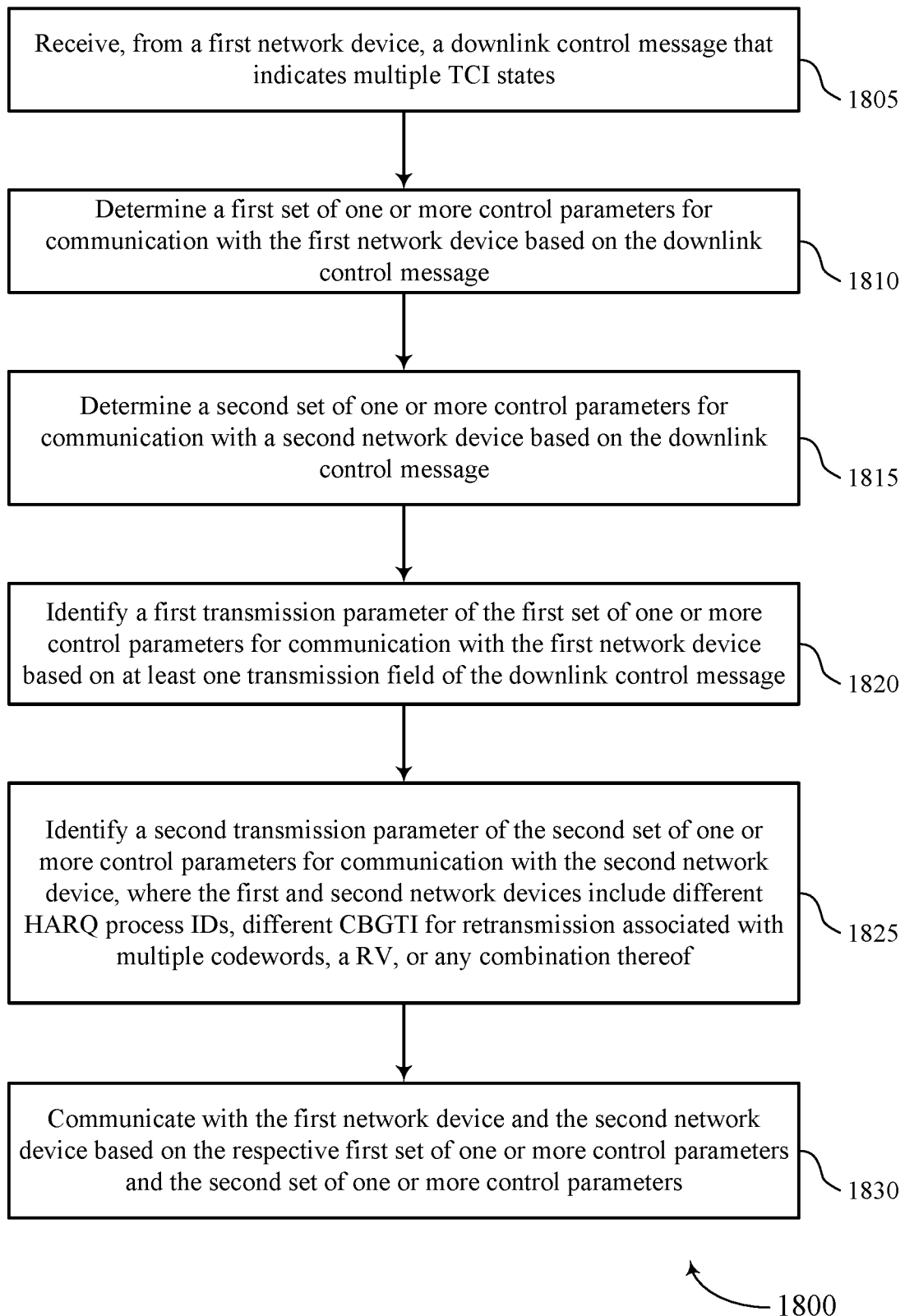

FIG. 18 shows a flowchart illustrating a method 1800 that supports flexible control information for wireless communications in accordance with one or more aspects of the present disclosure. The operations of method 1800 may be implemented by a UE 115 or its components as described herein. For example, the operations of method 1800 may be performed by a communications manager as described with reference to FIGS. 7 through 10. In some examples, a UE may execute a set of instructions to control the functional elements of the UE to perform the functions described herein. Additionally or alternatively, a UE may perform aspects of the functions described herein using special-purpose hardware.

At 1805, the UE may receive, from a first network device, a downlink control message that indicates multiple TCI states. In some cases, the downlink control message includes a TCI field indicating multiple TCI states. In some cases, the multiple TCI states identify QCL relationships for the UE. The operations of 1805 may be performed according to the methods described herein. In some examples, aspects of the operations of 1805 may be performed by a control receiver as described with reference to FIGS. 7 through 10.

At 1810, the UE may determine a first set of one or more control parameters for communication with the first network device based on the downlink control message. The operations of 1810 may be performed according to the methods described herein. In some examples, aspects of the operations of 1810 may be performed by a first parameter component as described with reference to FIGS. 7 through 10.

At 1815, the UE may determine a second set of one or more control parameters for communication with a second network device based on the downlink control message. In some cases, the second set of one or more control parameters is different from the first set of one or more control parameters. The operations of 1815 may be performed according to the methods described herein. In some examples, aspects of the operations of 1815 may be performed by a second parameter component as described with reference to FIGS. 7 through 10.

At 1820, the UE may identify a first transmission parameter of the first set of one or more control parameters for communication with the first network device based on at least one transmission field of the downlink control message. The operations of 1820 may be performed according to the methods described herein. In some examples, aspects of the operations of 1820 may be performed by a transmission manager as described with reference to FIGS. 7 through 10.

At 1825, the UE may identify a second transmission parameter of the second set of one or more control parameters for communication with the second network device, where the first and second transmission parameters include different HARQ process IDs, different CBGTI for retransmission associated with multiple CWs, an RV, or any combination thereof. The operations of 1825 may be performed according to the methods described herein. In some examples, aspects of the operations of 1825 may be performed by a transmission manager as described with reference to FIGS. 7 through 10.

At 1830, the UE may communicate with the first network device and the second network device based on the respective first set of one or more control parameters and the second set of one or more control parameters. The operations of 1830 may be performed according to the methods described herein. In some examples, aspects of the operations of 1830 may be performed by a communications component as described with reference to FIGS. 7 through 10.

Figure 19:
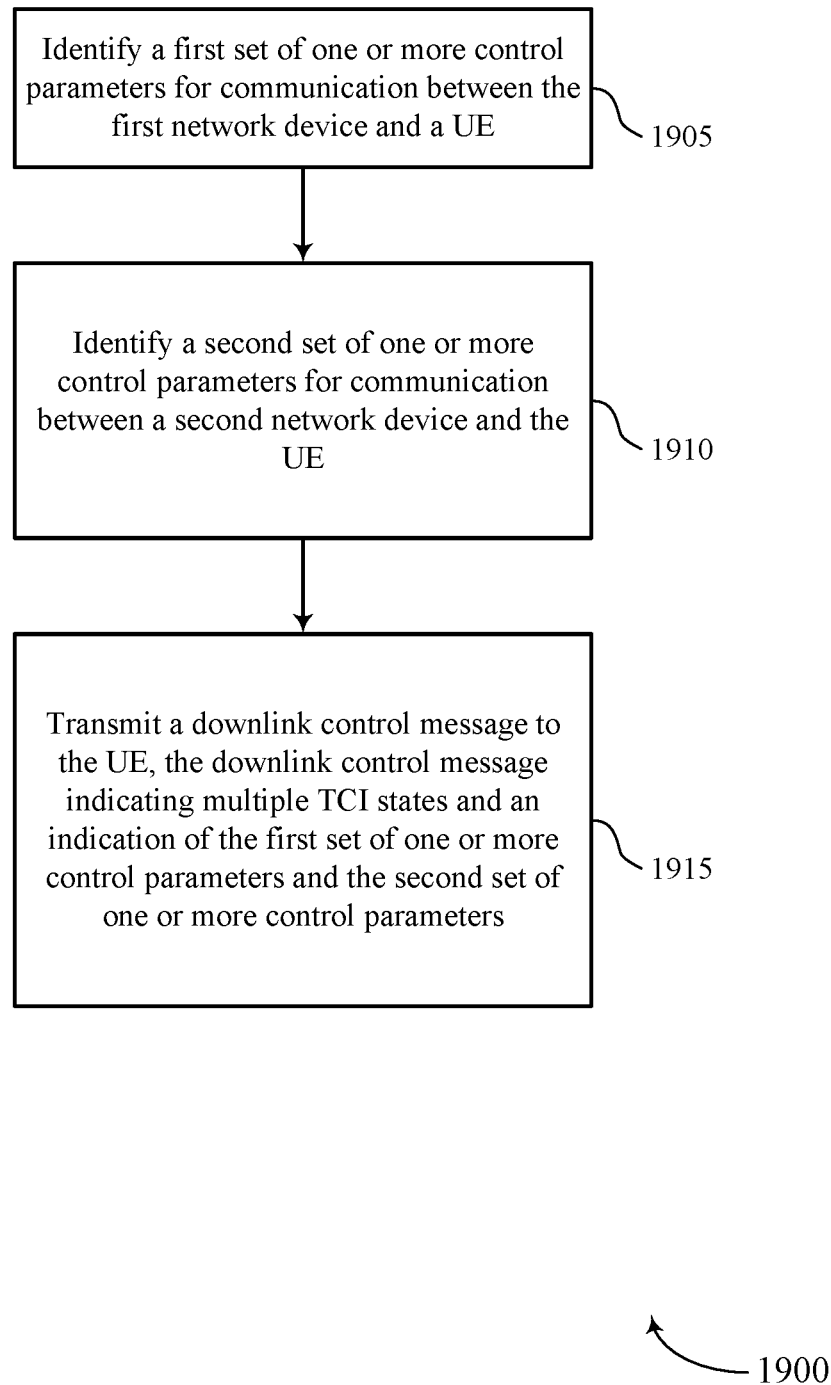

FIG. 19 shows a flowchart illustrating a method 1900 that supports flexible control information for wireless communications in accordance with one or more aspects of the present disclosure. The operations of method 1900 may be implemented by a TRP 105, a base station 105, or a network device 105, or their components as described herein. For example, the operations of method 1900 may be performed by a communications manager as described with reference to FIGS. 11 through 14. In some examples, a base station may execute a set of instructions to control the functional elements of the base station to perform the functions described herein. Additionally or alternatively, a base station may perform aspects of the functions described herein using special-purpose hardware.

At 1905, the base station may identify a first set of one or more control parameters for communication between the first network device and a UE. The operations of 1905 may be performed according to the methods described herein. In some examples, aspects of the operations of 1905 may be performed by a first parameter identifier as described with reference to FIGS. 11 through 14.

At 1910, the base station may identify a second set of one or more control parameters for communication between a second network device and the UE. In some cases, the second set of one or more control parameters is different from the first set of one or more control parameters. The operations of 1910 may be performed according to the methods described herein. In some examples, aspects of the operations of 1910 may be performed by a second parameter identifier as described with reference to FIGS. 11 through 14.

At 1915, the base station may transmit a downlink control message to the UE, the downlink control message indicates multiple TCI states and an indication of the first set of one or more control parameters and the second sets of control parameters. The operations of 1915 may be performed according to the methods described herein. In some examples, aspects of the operations of 1915 may be performed by a downlink message component as described with reference to FIGS. 11 through 14.

Figure 20:
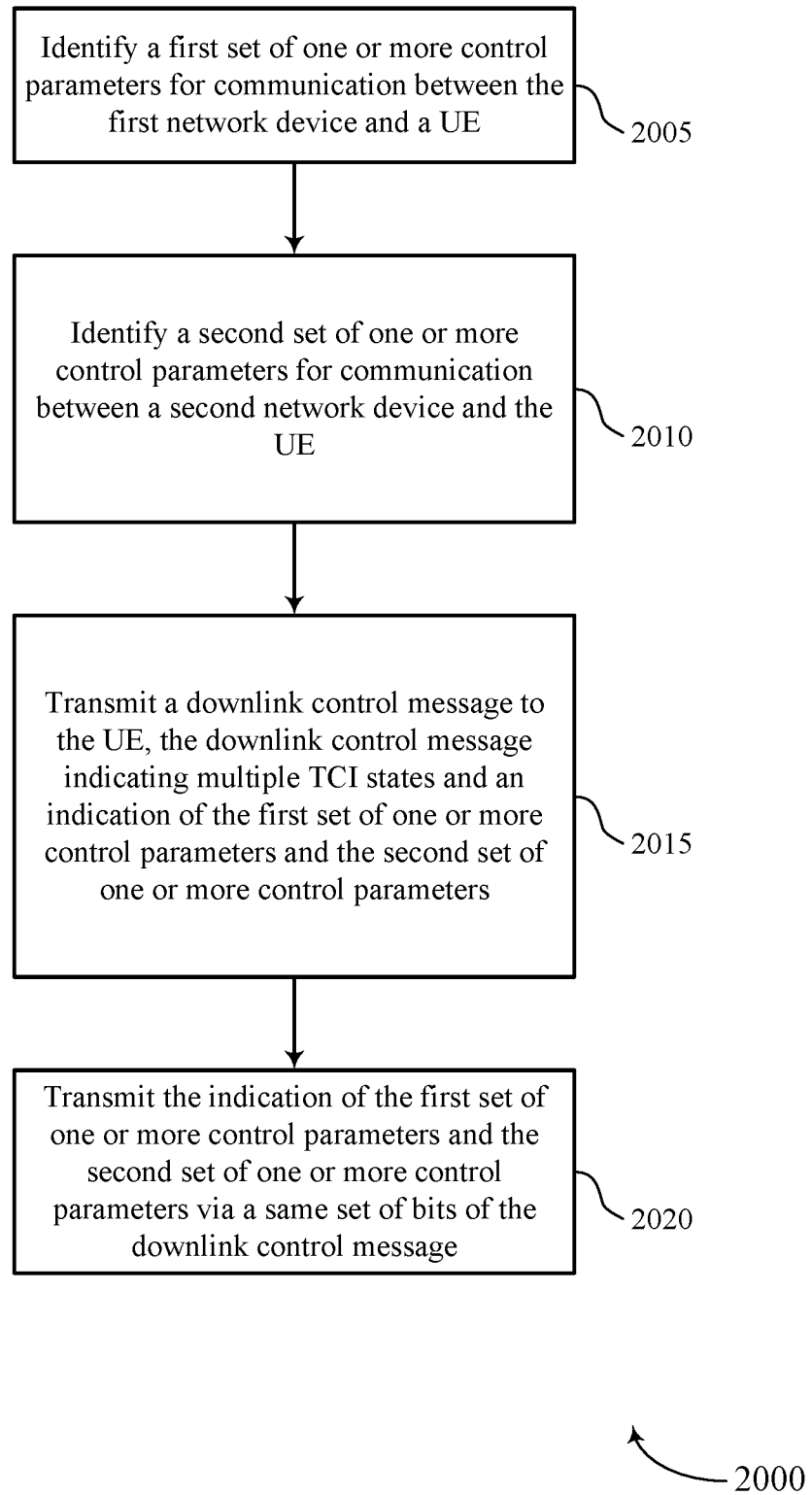

FIG. 20 shows a flowchart illustrating a method 2000 that supports flexible control information for wireless communications in accordance with one or more aspects of the present disclosure. The operations of method 2000 may be implemented by a TRP 105, a base station 105, or network device 105, or their components as described herein. For example, the operations of method 2000 may be performed by a communications manager as described with reference to FIGS. 11 through 14. In some examples, a base station may execute a set of instructions to control the functional elements of the base station to perform the functions described herein. Additionally or alternatively, a base station may perform aspects of the functions described herein using special-purpose hardware.

At 2005, the base station may identify a first set of one or more control parameters for communication between the first network device and a UE. The operations of 2005 may be performed according to the methods described herein. In some examples, aspects of the operations of 2005 may be performed by a first parameter identifier as described with reference to FIGS. 11 through 14.

At 2010, the base station may identify a second set of one or more control parameters for communication between a second network device and the UE. In some cases, the second set of one or more control parameters is different from the first set of one or more control parameters. The operations of 2010 may be performed according to the methods described herein. In some examples, aspects of the operations of 2010 may be performed by a second parameter identifier as described with reference to FIGS. 11 through 14.

At 2015, the base station may transmit a downlink control message to the UE, the downlink control message indicating multiple TCI states and an indication of the first set of one or more control parameters and the second sets of control parameters. The operations of 2015 may be performed according to the methods described herein. In some examples, aspects of the operations of 2015 may be performed by a downlink message component as described with reference to FIGS. 11 through 14.

At 2020, the base station may transmit the indication of the first set of one or more control parameters and the second set of control parameters via a same set of bits of the downlink control message. The operations of 2020 may be performed according to the methods described herein. In some examples, aspects of the operations of 2020 may be performed by an indication component as described with reference to FIGS. 11 through 14.

Figure 21:
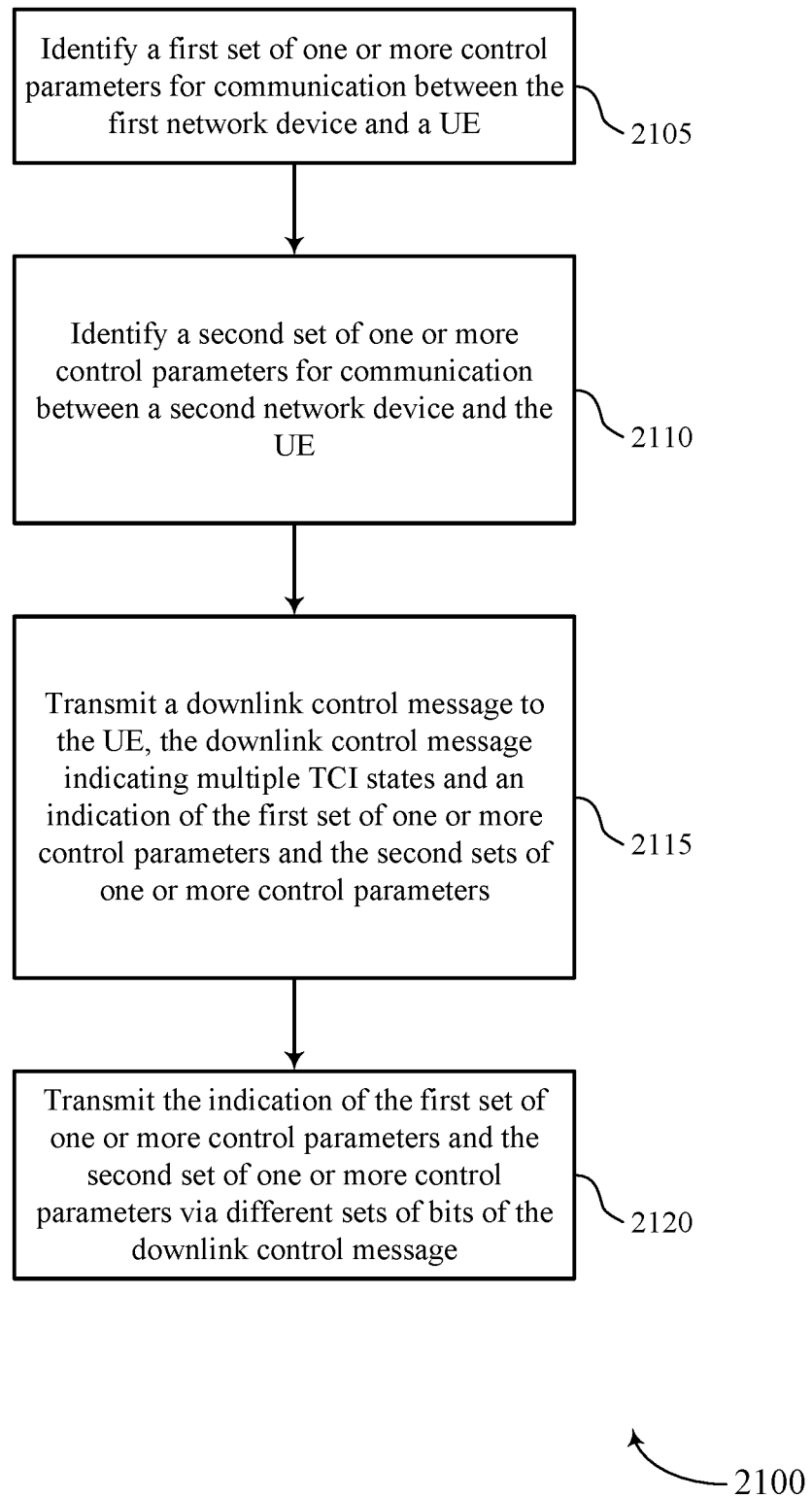

FIG. 21 shows a flowchart illustrating a method 2100 that supports flexible control information for wireless communications in accordance with one or more aspects of the present disclosure. The operations of method 2100 may be implemented by a base station 105, a TRP 105, or network device 105, or their components as described herein. For example, the operations of method 2100 may be performed by a communications manager as described with reference to FIGS. 11 through 14. In some examples, a base station may execute a set of instructions to control the functional elements of the base station to perform the functions described herein. Additionally or alternatively, a base station may perform aspects of the functions described herein using special-purpose hardware.

At 2105, the base station may identify a first set of one or more control parameters for communication between the first network device and a UE. The operations of 2105 may be performed according to the methods described herein. In some examples, aspects of the operations of 2105 may be performed by a first parameter identifier as described with reference to FIGS. 11 through 14.

At 2110, the base station may identify a second set of one or more control parameters for communication between a second network device and the UE. In some cases, the second set of one or more control parameters is different from the first set of one or more control parameters. The operations of 2110 may be performed according to the methods described herein. In some examples, aspects of the operations of 2110 may be performed by a second parameter identifier as described with reference to FIGS. 11 through 14.

At 2115, the base station may transmit a downlink control message to the UE, the downlink control message indicating multiple TCI states and an indication of the first set of one or more control parameters and the second sets of control parameters. The operations of 2115 may be performed according to the methods described herein. In some examples, aspects of the operations of 2115 may be performed by a downlink message component as described with reference to FIGS. 11 through 14.

At 2120, the base station may transmit the indication of the first set of one or more control parameters and the second set of one or more control parameters via different sets of bits of the downlink control message. The operations of 2120 may be performed according to the methods described herein. In some examples, aspects of the operations of 2120 may be performed by an indication component as described with reference to FIGS. 11 through 14.

Figure 22:
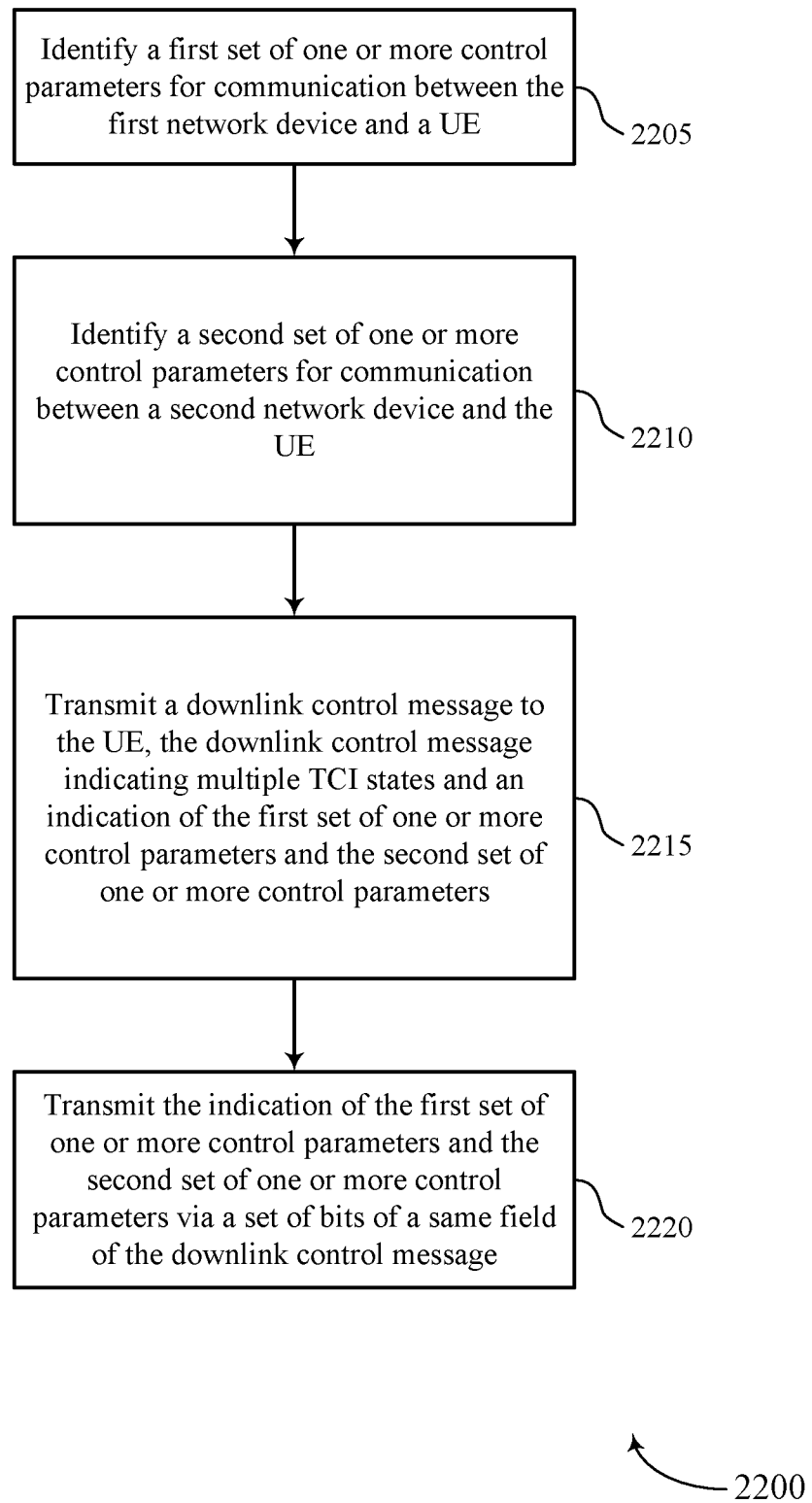

FIG. 22 shows a flowchart illustrating a method 2200 that supports flexible control information for wireless communications in accordance with one or more aspects of the present disclosure. The operations of method 2200 may be implemented by a base station 105, a TRP 105, or network device 105, or their components as described herein. For example, the operations of method 2200 may be performed by a communications manager as described with reference to FIGS. 11 through 14. In some examples, a base station may execute a set of instructions to control the functional elements of the base station to perform the functions described herein. Additionally or alternatively, a base station may perform aspects of the functions described herein using special-purpose hardware.

At 2205, the base station may identify a first set of one or more control parameters for communication between the first network device and a UE. The operations of 2205 may be performed according to the methods described herein. In some examples, aspects of the operations of 2205 may be performed by a first parameter identifier as described with reference to FIGS. 11 through 14.

At 2210, the base station may identify a second set of one or more control parameters for communication between a second network device and the UE. In some cases, the second set of one or more control parameters is different from the first set of one or more control parameters. The operations of 2210 may be performed according to the methods described herein. In some examples, aspects of the operations of 2210 may be performed by a second parameter identifier as described with reference to FIGS. 11 through 14.

At 2215, the base station may transmit a downlink control message to the UE, the downlink control message indicating multiple TCI states and an indication of the first set of one or more control parameters and the second sets of control parameters. The operations of 2215 may be performed according to the methods described herein. In some examples, aspects of the operations of 2215 may be performed by a downlink message component as described with reference to FIGS. 11 through 14.

At 2220, the base station may transmit the indication of the first set of one or more control parameters and the second set of one or more control parameters via a set of bits of a same field of the downlink control message. The operations of 2220 may be performed according to the methods described herein. In some examples, aspects of the operations of 2220 may be performed by an indication component as described with reference to FIGS. 11 through 14.

It should be noted that the methods described herein describe possible implementations, and that the operations may be rearranged or otherwise modified and that other implementations are possible. Further, aspects from two or more of the methods may be combined.

Techniques described herein may be used for various wireless communications systems such as CDMA, TDMA, FDMA, OFDMA, single carrier FDMA (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), E-UTRA, Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
    receiving, from a first network device, a downlink control information (DCI) message, wherein the DCI message includes a field comprising a quantity of transmission configuration indicator states;
    determining a first set of one or more control parameters for communication with the first network device based at least in part on the DCI message and the quantity of transmission configuration indicator states;
    determining a second set of one or more control parameters for communication with a second network device based at least in part on the DCI message and the quantity of transmission configuration indicator states; and
    communicating with the first network device and the second network device based at least in part on the respective first set of one or more control parameters and the second set of one or more control parameters.

2. The method of claim 1, further comprising:
    determining the first set of one or more control parameters and the second set of one or more control parameters based at least in part on a same set of bits of the DCI message.

3. The method of claim 1, further comprising:
    determining the first set of one or more control parameters and the second set of one or more control parameters based at least in part on a set of bits of a same field of the DCI message.

4. The method of claim 3, wherein:
    the first set of one or more control parameters is determined based at least in part on a first subset of the set of bits of the same field; and
    the second set of one or more control parameters is determined based at least in part on a second subset of the set of bits of the same field.

5. The method of claim 1, further comprising:
    determining the first set of one or more control parameters and the second set of one or more control parameters based at least in part on a same table of one or more control parameters for the first network device and the second network device.

6. The method of claim 1, further comprising:
    determining the first set of one or more control parameters based at least in part on a first table of one or more control parameters associated with the first network device; and
    determining the second set of one or more control parameters based at least in part on a second table of one or more control parameters associated with the second network device.

7. The method of claim 1, further comprising:
    determining the first set of one or more control parameters based at least in part on a first set of bits of the DCI message; and
    determining the second set of one or more control parameters based at least in part on a second set of bits of the DCI message non-overlapping with the first set of bits, wherein the first and second sets of bits are associated with different fields of the DCI message.

8. The method of claim 1, wherein determining the second set of one or more control parameters comprises:
    determining at least one control parameter of the second set of one or more control parameters based at least in part on a delta with respect to a control parameter of the first set of one or more control parameters.

9. The method of claim 8, further comprising:
determining the delta based at least in part on a row-index of a table of one or more control parameters for the first and second network devices.

10. The method of claim 1, further comprising:
identifying a first resource assignment of the first set of one or more control parameters for communication with the first network device based at least in part on at least one resource assignment field of the DCI message; and
identifying a second resource assignment of the second set of one or more control parameters for communication with the second network device, wherein the first and second resource assignments comprise different start symbol and length indicators (SLIVs), different mapping types, or both.

11. The method of claim 10, further comprising:
determining the first resource assignment based at least in part on a first set of bits of the at least one resource assignment field; and
determining the second resource assignment based at least in part on a second set of bits of the at least one resource assignment field.

12. The method of claim 11, wherein:
the first set of bits points to a row of parameters within a first resource assignment table;
the first resource assignment is determined based at least in part on the row of parameters within the first resource assignment table;
the second set of bits points to a second row of parameters within a second resource assignment table; and
the second resource assignment is determined based at least in part on the second row of parameters within the second resource assignment table.

13. The method of claim 10, wherein the second resource assignment is identified based at least in part on a first set of bits of the at least one resource assignment field or a second set of bits non-overlapping with the first set of bits.

14. The method of claim 1, further comprising:
identifying a first rate matching parameter of the first set of one or more control parameters for communication with the first network device based at least in part on at least one rate matching field of the DCI message; and
identifying a second rate matching parameter of the second set of one or more control parameters for communication with the second network device, wherein the first and second rate matching parameters comprise different resource block and symbol level rate matching patterns, different resource element level rate matching patterns, different zero-power channel state information reference signal (ZP CSI-RS) resource sets, or any combination thereof.

15. The method of claim 14, wherein the second rate matching parameter is identified based at least in part on a first set of bits of the at least one rate matching field, or a second set of bits non-overlapping with the first set of bits, or rate matching field of the DCI message that is different from the at least one rate matching field, wherein the first set of bits or the second set of bits correspond to a rate matching pattern of a set of rate matching patterns configured for the UE.

16. The method of claim 1, further comprising:
identifying a first transmission parameter of the first set of one or more control parameters for communication with the first network device based at least in part on at least one transmission field of the DCI message; and
identifying a second transmission parameter of the second set of one or more control parameters for communication with the second network device, wherein the first and second transmission parameters comprise different hybrid automatic repeat request (HARQ) process identifiers (IDs), different code block group transmission information (CBGTI) for retransmission associated with multiple codewords, a redundancy version (RV), or any combination thereof.

17. The method of claim 16, wherein the second transmission parameter is identified based at least in part on a first set of bits of the at least one transmission field or a second set of bits non-overlapping with the first set of bits.

18. The method of claim 16, wherein the second transmission parameter is identified based at least in part on a transmission field of the DCI message that is different from the at least one transmission field.

19. The method of claim 16, wherein a number of code block groups for a first codeword transmission is different from a number of code block groups for a second codeword transmission.

20. The method of claim 1, wherein determining the second set of one or more control parameters comprises:
determining a start symbol of the second set of one or more control parameters based at least in part on a delta with respect to a start symbol of the first set of one or more control parameters.

21. The method of claim 1, wherein the quantity of transmission configuration indicator states correspond to multiple quasi co-location relationships for the UE.

22. The method of claim 1, wherein the DCI message is included in a physical downlink control channel, and wherein the field is a transmission configuration indicator field that indicates the quantity of transmission configuration indicator states.

23. A method for wireless communications at a first network device, comprising:
identifying a first set of one or more control parameters for communication between the first network device and a user equipment (UE) based at least in part on a quantity of transmission configuration indicator states;
identifying a second set of one or more control parameters for communication between a second network device and the UE based at least in part on the quantity of transmission configuration indicator states; and
transmitting a downlink control information (DCI) message to the UE, the DCI message, wherein the DCI message includes a field comprising the quantity of transmission configuration indicator states and an indication of the first set of one or more control parameters and the second set of one or more control parameters.

24. The method of claim 23, further comprising:
transmitting the indication of the first set of one or more control parameters and the second set of one or more control parameters via a same set of bits of the DCI message.

25. The method of claim 23, further comprising:
transmitting the indication of the first set of one or more control parameters and the second set of one or more control parameters via different sets of bits of the DCI message.

26. The method of claim 23, further comprising:
transmitting the indication of the first set of one or more control parameters and the second set of one or more control parameters via a set of bits of a same field of the DCI message.

27. The method of claim 23, further comprising:
transmitting the indication of the first set of one or more control parameters and the second set of one or more control parameters via different fields of the DCI message.

28. The method of claim 23, further comprising:
transmitting the indication of the first set of one or more control parameters and the second set of one or more control parameters based at least in part on a delta between a control parameter of the first set of one or more control parameters and a control parameter of the second set of one or more control parameters.

29. An apparatus for wireless communications at a user equipment (UE), comprising:
a processor; and
memory coupled to the processor, the processor and memory configured to:
receive, from a first network device, a downlink control information (DCI) message, wherein the DCI message includes a field comprising a quantity of transmission configuration indicator states;
determine a first set of one or more control parameters for communication with the first network device based at least in part on the DCI message and the quantity of transmission configuration indicator states;
determine a second set of one or more control parameters for communication with a second network device based at least in part on the DCI message and the quantity of transmission configuration indicator states; and
communicate with the first network device and the second network device based at least in part on the respective first set of one or more control parameters and the second set of one or more control parameters.

30. An apparatus for wireless communications at a first network device, comprising:
a processor; and
memory coupled to the processor, the processor and memory configured to:
identify a first set of one or more control parameters for communication between the first network device and a user equipment (UE) based at least in part on a quantity of transmission configuration indicator states;
identify a second set of one or more control parameters for communication between a second network device and the UE based at least in part on the quantity of transmission configuration indicator states; and
transmit a downlink control information (DCI) message to the UE, the DCI message including a field comprising an indication of the quantity of transmission configuration indicator states and an indication of the first set of one or more control parameters and the second set of one or more control parameters.

31. A method for wireless communications at a user equipment (UE), comprising:
receiving a downlink control information (DCI) message, wherein the DCI message includes a field comprising a quantity of transmission configuration indicator states, wherein a first transmission configuration indicator state is associated with a first set of one or more control parameters and a second transmission configuration indicator state is associated with a second set of one or more control parameters;
communicating in accordance with the first transmission configuration indicator state based at least in part on the first set of one or more control parameters;
determining at least one control parameter of the second set of one or more control parameters based at least in part on a delta with respect to a control parameter of the first set of one or more control parameters; and
communicating in accordance with the second transmission configuration indicator state based at least in part on the second set of one or more control parameters.

32. The method of claim 31, wherein determining the second set of one or more control parameters comprises:
determining at least one control parameter of the second set of one or more control parameters based at least in part on a delta with respect to a control parameter of the first set of one or more control parameters.

33. The method of claim 31, further comprising:
identifying a first resource assignment of the first set of one or more control parameters for communication with a first network device based at least in part on at least one resource assignment field of the DCI message; and
identifying a second resource assignment of the second set of one or more control parameters for communication with a second network device, wherein the first and second resource assignments comprise different start symbol and length indicators (SLIVs), different mapping types, or both.

34. The method of claim 31, further comprising:
identifying a first transmission parameter of the first set of one or more control parameters for communication with a first network device based at least in part on at least one transmission field of the DCI message; and
identifying a second transmission parameter of the second set of one or more control parameters for communication with a second network device, wherein the first and second transmission parameters comprise different hybrid automatic repeat request (HARQ) process identifiers (IDs), different code block group transmission information (CBGTI) for retransmission associated with multiple codewords, a redundancy version (RV), or any combination thereof.

35. The method of claim 31, wherein determining the second set of one or more control parameters comprises:
determining a start symbol of the second set of one or more control parameters based at least in part on a delta with respect to a start symbol of the first set of one or more control parameters.

36. The method of claim 31, wherein the DCI message is included in a physical downlink control channel, and wherein the field is a transmission configuration indicator field that indicates the quantity of transmission configuration indicator states.

37. An apparatus for wireless communications at a user equipment (UE), comprising:
a processor; and
memory coupled to the processor, the processor and memory configured to:
receive a downlink control information (DCI) message, wherein the DCI message includes a field comprising a quantity of transmission configuration indicator states, wherein a first transmission configuration indicator state is associated with a first set of one or more control parameters and a second transmission configuration indicator state is associated with a second set of one or more control parameters;
communicate in accordance with the first transmission configuration indicator state based at least in part on the first set of one or more control parameters;
determine at least one control parameter of the second set of one or more control parameters based at least in part on a delta with respect to a control parameter of the first set of one or more control parameters; and
communicate in accordance with the second transmission configuration indicator state based at least in part on the second set of one or more control parameters.

38. The apparatus of claim 37, wherein to determine the second set of one or more control parameters, the processor and memory are configured to:
determine at least one control parameter of the second set of one or more control parameters based at least in part on a delta with respect to a control parameter of the first set of one or more control parameters.

39. The apparatus of claim 37, wherein the processor and memory are further configured to:
identify a first resource assignment of the first set of one or more control parameters for communication with a first network device based at least in part on at least one resource assignment field of the DCI message; and
identify a second resource assignment of the second set of one or more control parameters for communication with a second network device, wherein the first and second resource assignments comprise different start symbol and length indicators (SLIVs), different mapping types, or both.

40. The apparatus of claim 37, wherein the processor and memory are further configured to:
identify a first transmission parameter of the first set of one or more control parameters for communication with a first network device based at least in part on at least one transmission field of the DCI message; and
identify a second transmission parameter of the second set of one or more control parameters for communication with a second network device, wherein the first and second transmission parameters comprise different hybrid automatic repeat request (HARQ) process identifiers (IDs), different code block group transmission information (CBGTI) for retransmission associated with multiple codewords, a redundancy version (RV), or any combination thereof.

41. The apparatus of claim 37, wherein to determine the second set of one or more control parameters, the processor and memory are further configured to:
determine a start symbol of the second set of one or more control parameters based at least in part on a delta with respect to a start symbol of the first set of one or more control parameters.

42. The apparatus of claim 37, wherein the DCI message is included in a physical downlink control channel, and wherein the field is a transmission configuration indicator field that indicates the quantity of transmission configuration indicator states.

43. A non-transitory computer-readable medium storing code for wireless communications at a user equipment (UE), the code comprising instructions executable by a processor to:
receive a downlink control information (DCI) message, wherein the DCI message includes a field comprising a quantity of transmission configuration indicator states, wherein a first transmission configuration indicator state is associated with a first set of one or more control parameters and a second transmission configuration indicator state is associated with a second set of one or more control parameters;
communicate in accordance with the first transmission configuration indicator state based at least in part on the first set of one or more control parameters;
determine at least one control parameter of the second set of one or more control parameters based at least in part on a delta with respect to a control parameter of the first set of one or more control parameters; and
communicate in accordance with the second transmission configuration indicator state based at least in part on the second set of one or more control parameters.

44. The non-transitory computer-readable medium of claim 43, wherein the instructions to determine the second set of one or more control parameters are executable by the processor to:
determine at least one control parameter of the second set of one or more control parameters based at least in part on a delta with respect to a control parameter of the first set of one or more control parameters.

45. The non-transitory computer-readable medium of claim 43, wherein the instructions are further executable by the processor to:
identify a first resource assignment of the first set of one or more control parameters for communication with a first network device based at least in part on at least one resource assignment field of the DCI message; and
identify a second resource assignment of the second set of one or more control parameters for communication with a second network device, wherein the first and second resource assignments comprise different start symbol and length indicators (SLIVs), different mapping types, or both.

46. The non-transitory computer-readable medium of claim 43, wherein the instructions are further executable by the processor to:
identify a first transmission parameter of the first set of one or more control parameters for communication with a first network device based at least in part on at least one transmission field of the DCI message; and
identify a second transmission parameter of the second set of one or more control parameters for communication with a second network device, wherein the first and second transmission parameters comprise different hybrid automatic repeat request (HARQ) process identifiers (IDs), different code block group transmission information (CBGTI) for retransmission associated with multiple codewords, a redundancy version (RV), or any combination thereof.

47. The non-transitory computer-readable medium of claim 43, wherein the instructions to determine the second set of one or more control parameters are executable by the processor to:
determine a start symbol of the second set of one or more control parameters based at least in part on a delta with respect to a start symbol of the first set of one or more control parameters.

48. The non-transitory computer-readable medium of claim 43, wherein:
the DCI message is included in a physical downlink control channel, and the field is a transmission configuration indicator field that indicates the quantity of transmission configuration indicator states.

* * * * *